US011526905B1

(12) United States Patent
Kamvysselis

(10) Patent No.: US 11,526,905 B1
(45) Date of Patent: Dec. 13, 2022

(54) SYSTEMS AND METHODS FOR PRESERVING PRIVACY

(71) Applicant: Google LLC, Mountain View, CA (US)

(72) Inventor: Peter Kellis Kamvysselis, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/172,697

(22) Filed: Feb. 10, 2021

Related U.S. Application Data

(63) Continuation of application No. 16/172,209, filed on Oct. 26, 2018, now Pat. No. 10,929,874, which is a continuation of application No. 15/097,689, filed on Apr. 13, 2016, now Pat. No. 10,115,124, which is a continuation of application No. 12/052,616, filed on Mar. 20, 2008, now abandoned.

(Continued)

(51) Int. Cl.
| | |
|---|---|
| *G06Q 30/00* | (2012.01) |
| *G06Q 30/02* | (2012.01) |
| *G06F 21/60* | (2013.01) |
| *G06F 21/62* | (2013.01) |

(52) U.S. Cl.
CPC ......... *G06Q 30/0244* (2013.01); *G06F 21/60* (2013.01); *G06F 21/6254* (2013.01); *G06Q 30/0242* (2013.01)

(58) Field of Classification Search
CPC ..................................... G06Q 30/0241–0277
See application file for complete search history.

(56) References Cited

U.S. PATENT DOCUMENTS

| 5,948,061 A | * | 9/1999 | Merriman | .......... | G06Q 30/0251 |
| | | | | | 709/219 |
| 7,051,074 B1 | * | 5/2006 | Buchsbaum | ....... | G06Q 30/0241 |
| | | | | | 709/228 |

(Continued)

OTHER PUBLICATIONS

Zhang, Jianqing, et al. "Outsourcing Security Analysis with Anonymized Logs." Second International Workshop on the Value of Security through Collaboration (SECQVAL)'06, Baltimore, MD Sep. 2006. (Year: 2006).*

(Continued)

*Primary Examiner* — Luis A Brown
(74) *Attorney, Agent, or Firm* — Fish & Richardson P.C.

(57) ABSTRACT

A system collects information from different sources regarding online activities of users and information regarding presentation of additional content. The user online activity information can include an indication of a web page visited (e.g., URL), a time when the web page was visited, and an anonymized identifier for a user device. Additional content service information can include an additional content identifier, a time the additional content was served, and an anonymized identifier for a user device to which the additional content was served. An optimizing engine uses this information to correlate additional content presentation to user online activity while preserving privacy of users. The system can use the correlation information to perform various statistical analyses, including determining the effects of presentation of particular additional content on user online activity, while preserving the privacy of individual users and preventing the information from being linked to a particular user.

20 Claims, 17 Drawing Sheets

Related U.S. Application Data

(60) Provisional application No. 60/976,793, filed on Oct. 1, 2007.

(56) References Cited

U.S. PATENT DOCUMENTS

| | | | | |
|---|---|---|---|---|
| 7,130,808 | B1* | 10/2006 | Ranka | G06Q 10/06315 705/7.29 |
| 7,257,546 | B2* | 8/2007 | Ebrahimi | G06Q 30/02 709/219 |
| 7,406,434 | B1* | 7/2008 | Chang | G06Q 30/0204 705/14.1 |
| 7,813,954 | B1* | 10/2010 | Price | G06Q 30/0207 705/14.1 |
| 7,827,062 | B2* | 11/2010 | Merriman | G06Q 30/0254 705/14.55 |
| 7,996,521 | B2* | 8/2011 | Chamberlain | H04L 67/55 709/224 |
| 8,321,278 | B2* | 11/2012 | Haveliwala | G06F 16/9535 705/14.66 |
| 2001/0054155 | A1* | 12/2001 | Hagan | H04L 67/306 707/999.009 |
| 2002/0004733 | A1* | 1/2002 | Addante | G06Q 30/0253 705/14.51 |
| 2002/0072965 | A1* | 6/2002 | Merriman | G06Q 30/0254 705/14.49 |
| 2003/0018906 | A1* | 1/2003 | Smith | G06F 21/125 713/189 |
| 2003/0088463 | A1* | 5/2003 | Kanevsky | G06Q 30/0271 705/14.66 |
| 2005/0071465 | A1* | 3/2005 | Zeng | G06F 16/9535 709/224 |
| 2005/0222987 | A1* | 10/2005 | Vadon | G06F 16/907 |
| 2005/0235030 | A1* | 10/2005 | Lauckhart | G06Q 30/0246 709/200 |
| 2005/0240557 | A1* | 10/2005 | Rorex | G06Q 30/0277 |
| 2007/0027760 | A1* | 2/2007 | Collins | G06Q 30/0243 705/14.54 |
| 2007/0027762 | A1* | 2/2007 | Collins | G06Q 30/0242 705/14.66 |
| 2007/0038516 | A1* | 2/2007 | Apple | G06Q 30/02 705/14.42 |
| 2007/0073585 | A1* | 3/2007 | Apple | G06Q 30/0247 705/14.46 |
| 2007/0121843 | A1* | 5/2007 | Atazky | G06Q 50/01 379/114.13 |
| 2007/0129999 | A1* | 6/2007 | Zhou | G06Q 30/0273 705/14.69 |
| 2007/0143186 | A1* | 6/2007 | Apple | G06Q 30/0249 705/14.48 |
| 2007/0150949 | A1* | 6/2007 | Futamura | H04L 63/1416 726/22 |
| 2007/0244746 | A1* | 10/2007 | Issen | H04L 67/306 709/224 |
| 2008/0021872 | A1* | 1/2008 | Borrillo | G06F 16/951 |
| 2008/0033790 | A1* | 2/2008 | Nickerson | G06Q 30/02 705/7.32 |
| 2008/0086741 | A1* | 4/2008 | Feldman | G06Q 30/0242 725/9 |
| 2008/0201311 | A1 | 8/2008 | Ertugrul et al. | |
| 2008/0249855 | A1* | 10/2008 | Collins | G06Q 30/0256 705/14.54 |
| 2008/0281694 | A1* | 11/2008 | Kretz | G06Q 30/02 705/14.64 |
| 2008/0300894 | A1* | 12/2008 | John | H04N 21/44224 705/1.1 |
| 2008/0320119 | A1* | 12/2008 | Achan | H04L 63/1408 709/222 |
| 2009/0063268 | A1* | 3/2009 | Burgess | G06Q 30/0239 705/14.39 |
| 2009/0070129 | A1* | 3/2009 | Inbar | G06Q 30/018 705/317 |
| 2009/0089296 | A1 | 4/2009 | Stemeseder et al. | |
| 2009/0125444 | A1* | 5/2009 | Cochran | G06Q 30/0185 705/50 |
| 2010/0049602 | A1* | 2/2010 | Softky | G06Q 30/0246 705/14.45 |
| 2010/0161492 | A1* | 6/2010 | Harvey | G06Q 30/0246 705/50 |
| 2011/0029376 | A1* | 2/2011 | Mills | G06Q 30/02 705/14.43 |

OTHER PUBLICATIONS

Loesing, Karsten, et al. "Privacy-Aware Presence Management in Instant Messaging Systems." Distributed and Mobile Systems Groups, Bamberg, Germany, IEEE, 2006. (Year: 2006).*

* cited by examiner

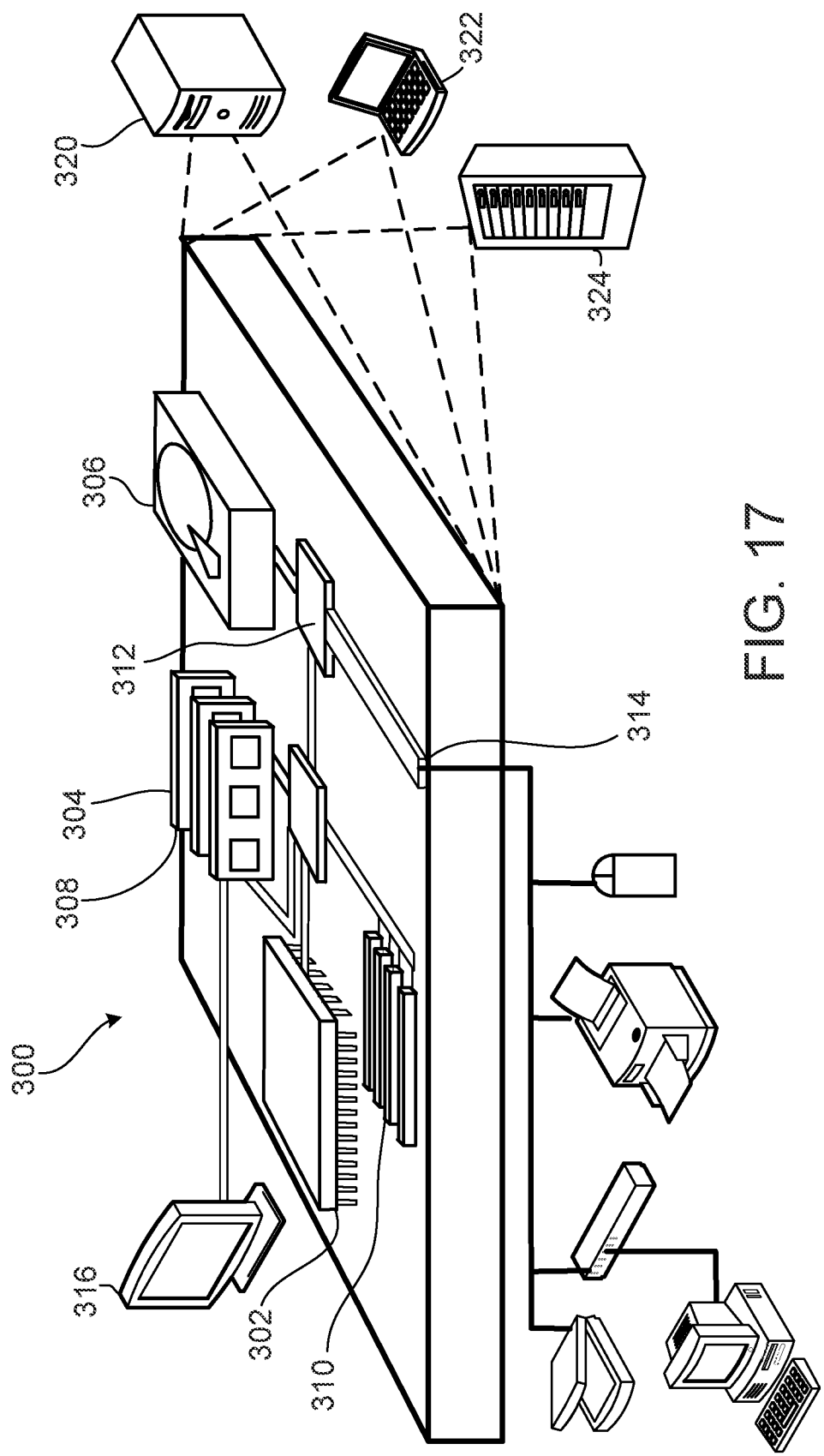

SYSTEMS AND METHODS FOR PRESERVING PRIVACY

CROSS-REFERENCE TO RELATED APPLICATIONS

This application is a continuation of and claims priority to U.S. application Ser. No. 16/172,209, filed on Oct. 26, 2018, which is a continuation of and claims priority to U.S. application Ser. No. 15/097,689, filed on Apr. 13, 2016, which is a continuation of and claims priority to U.S. application Ser. No. 12/052,616, filed on Mar. 20, 2008, which claims priority to U.S. Provisional Application Ser. No. 60/976,793, filed on Oct. 1, 2007 the entire contents of which are hereby incorporated by reference.

TECHNICAL FIELD

This document generally relates to information management and privacy protection.

BACKGROUND

On-line advertisements (or "ads") allow advertisers to reach a wide range of viewers through the Internet. Sponsors of ads may use intuition and past experiences to determine which audience to target. The sponsors are often interested in increasing the effectiveness of the ads. Some sponsors use post-campaign ad effectiveness studies to aid in determining the effectiveness of the ads. The reports may show, for example, whether online user behavior as manifested by web site visitations and search activity have increased due to the display of ads. The experience gained in one ad campaign may be used in designing future ad campaigns.

SUMMARY

In general, in one aspect, an advertising campaign is executed for a predetermined period of time to deliver an on-line advertisement to users, and the advertising campaign is dynamically adjusted during the predetermined period of time. Effectiveness of the advertisement on various categories of users is determined, in which the users are classified into the various categories based on one or more characteristics of on-line activities of the users. The advertising campaign is automatically adjusted based on the effectiveness of the advertisement on the various categories of users.

Implementations can include one or more of the following features. Adjusting the advertising campaign based on results of the evaluation can include increasing an advertising budget for targeting users whose on-line activities have a particular characteristic in which the effectiveness of the advertisement with respect to users whose on-line activities have the particular characteristic is higher than users whose on-line activities do not have the particular characteristic. The characteristics of on-line activities of the users can include at least one of web browsing patterns of the users, on-line purchasing patterns of the users, and opinions expressed in on-line surveys of the users. Using an iterative process, the effectiveness of the advertisement on various categories of users can be determined and the advertising campaign is automatically adjusted based on the determination. The categories that are evaluated for advertising effectiveness in a first iteration can be different from the categories that are evaluated for advertising effectiveness in a second iteration. The category of user for which the advertisement has the most effectiveness can change from iteration to iteration. A particular category of users for which the advertisement has a higher effect than the other categories is automatically identified, in which the particular category was not previously identified by a sponsor of the advertisement.

Some of the categories overlap one another so that some users belong to more than one category. Dynamically adjusting the advertising campaign can include increasing an advertising budget for targeting a website or web content for which the advertisement has a higher effectiveness on users who have visited the website or accessed the web content relative to users who have not visited the website or accessed the web content. The web content can include a text file, an image file, an audio file, a video file, or a Flash file. Dynamically adjusting the advertising campaign can include adding a website to, or removing a website from, a list of websites for which the advertisement is targeted. Dynamically adjusting the advertising campaign can include determining that the advertisement has a higher effect on users who accessed a first web site or web content than users who accessed a second web site or web content, identifying a third web site or web content that is frequently accessed by the users who accessed the first web site or web content, and increasing an advertising budget for targeting the third web site or web content. Dynamically adjusting the advertising campaign can include determining that the advertisement has a higher effect on a first category of users than a second category of users, identifying a third category of users who previously have not been targeted by the advertisement in which users of the first and third categories have similar on-line behaviors, and increasing an advertising budget to target the third category of users.

On-line behaviors of users who have received the advertisement and on-line behaviors of users who have not received the advertisement can be determined based on page link analysis histories obtained from the users and advertisement delivery histories obtained from one or more advertisement servers. Evaluating an effectiveness of the advertisement on various categories of users that are classified based on one or more characteristics of on-line activities of the users can include selecting a subset of characteristics from a plurality of characteristics, and evaluating the effectiveness of the advertisement on various categories of users that are classified based on the subset of characteristics. Demographic profiles of the users can be associated with the characteristics of on-line activities of the users, and the effectiveness of the advertisement on various demographic profiles of the users can be determined. The advertisement can include two or more creatives, and automatically adjusting the advertising campaign can include adjusting resources allocated to each of the creatives. The advertisement can include a first creative and a second creative, and dynamically adjusting the advertising campaign can include determining that the first creative has a higher effect when shown on a first web site than a second web site, determining that the second creative has a higher effect when shown on the second web site than the first web site, allocating an advertising budget so that more budget is used to target the first creative toward the first web site than the second web site, and allocating the advertising budget so that more budget is used to target the second creative toward the second web site than the first web site. A report can be automatically provided to a sponsor of the advertisement regarding the adjustments made to the advertising campaign.

In general, in another aspect, a target audience of an on-line advertising campaign is iteratively adjusted based on effectiveness of an on-line advertisement with respect to various categories of users that are classified based on one or more characteristics of on-line activities of the users, either without prior identification from a sponsor of the advertisement regarding which characteristics are used in the classification, or receiving an identification from the sponsor regarding which characteristics are used in classifying the users, and in some iterations determining effectiveness of the advertisement on various categories of users that are classified based on characteristics that include one or more characteristics not identified by the sponsor.

Implementations can include one or more of the following features. One or more characteristics are identified in which the advertisement has a higher effect on users having the one or more characteristics than users who do not have the one or more characteristics, the one or more characteristics including at least one characteristic not identified by a sponsor of the advertisement.

In general, in another aspect, an ad campaign is executed to target an advertisement based on a subset of a plurality of characteristics of on-line activities of users; a particular characteristic among the subset of characteristics is identified for which the advertisement has a highest effectiveness or an effectiveness above a threshold; characteristics of on-line activities of the group of users having the particular characteristic are identified; and an advertising campaign is dynamically adjusted to target characteristics of on-line activities of the group of users.

Implementations can include one or more of the following features. The subset of characteristics include frequent access of particular web sites, and targeting the advertisement based on the subset of characteristics includes targeting the particular web sites. Dynamically adjusting the advertising campaign includes targeting additional web sites that are frequently visited by the group of users.

In general, in another aspect, a categorization engine classifies users into categories based on one or more characteristics of on-line activities of the users; an ad effectiveness determination engine determines an effectiveness of an advertisement on various categories of users; and an ad campaign adjustment engine dynamically adjusts an advertising campaign based on the effectiveness of the advertisement with respect to the various categories of users.

Implementations can include one or more of the following features. The ad campaign adjustment engine can periodically gather information about the effectiveness of the advertisement with respect to one or more categories of users and automatically adjusts the advertising campaign based on the effectiveness of the advertisement with respect to the various categories of users. The ad campaign adjustment engine can dynamically adjust the advertising campaign by automatically performing (a) increasing an advertising budget for targeting a category of users for which the advertisement has a higher effectiveness relative to the other categories, (b) decreasing an advertising budget for targeting a category of users for which the advertisement has a lower effectiveness relative to the other categories, (c) increasing an advertising budget for targeting a website or web content for which the advertisement has a higher effectiveness on users who have accessed the website or web content relative to users who have not accessed the website or web content, or (d) decreasing an advertising budget for targeting a website or web content for which the advertisement has a lower effectiveness on users who have accessed the website or web content relative to users who have not accessed the website or web content. The ad campaign adjustment engine can dynamically add a website to, or removes a website from, a list of websites for which the advertisement is targeted. The categorization engine can identify the categories based on differences in at least one of web browsing patterns of the users, purchasing patterns of the users, or opinions as expressed in surveys of the users.

The ad effectiveness determination engine can determine the effectiveness of the advertisement by comparing on-line behaviors of users who have received the advertisement with on-line behaviors of users who have not received the advertisement. A storage can store a first data log having information about page link analysis histories of users and a second data log having information about delivery histories of advertisements. The ad effectiveness determination engine can infer page link analysis histories of users who have received the advertisement by correlating the first data log with the second data log, and can infer page link analysis histories of users who have not received the advertisement by correlating the first data log with the second data log. The ad effectiveness determination engine can determine effects of the advertisement by comparing page link analysis histories of users who have received the advertisement with page link analysis histories of users who have not received the advertisement. The ad campaign adjustment engine can iteratively adjust a target audience of the advertising campaign without prior identification from a sponsor of the advertisement regarding which characteristics are used in the classification of the users. The ad campaign adjustment engine can receive an identification from the sponsor regarding which characteristics are initially used in classifying the users, iteratively adjust a target audience of the advertising campaign, and in some iterations determine effectiveness of the advertisement on various categories of users that are classified according to characteristics that include one or more characteristics not identified by the sponsor.

In general, in another aspect, a categorization engine classifies users into categories based on one or more characteristics of on-line activities of the users; an ad effectiveness determination engine determines an effectiveness of an advertisement on various categories of users; and an ad server executes an ad campaign and dynamically adjusts the ad campaign to target an advertisement based on characteristics of on-line activities of users, in which characteristics associated with high ad effectiveness are used to identify a group of users, and the group of users are used to identify additional characteristics for which the advertisement is to target.

Implementations can include one or more of the following features. The characteristics can include frequent access of particular web sites, and targeting the advertisement based on the characteristics can include targeting the particular web sites. Dynamically adjusting the advertising campaign can include targeting additional web sites that are frequently visited by the group of users.

In general, in another aspect, an apparatus includes means for executing an advertising campaign for a predetermined period of time to deliver an on-line advertisement to users; and means for dynamically adjusting the advertising campaign during the predetermined period of time, including means for determining effectiveness of the advertisement on various categories of users that are classified based on one or more characteristics of on-line activities of the users, and means for automatically adjusting the advertising campaign based on the effectiveness of the advertisement on the various categories of users.

In general, in another aspect, a first data log having information about page link analysis of users browsing web pages is identified; a second data log having information about delivery histories of advertisements is identified; and the first data log is correlated with the second data log to infer page link analysis histories of users and information about the advertisements the users received on the web sites for which the users requested page link analysis information. The online behavior of users who have received the advertisements and that of users who have not received the advertisements as represented by the page link analysis requests are compared to determine the effectiveness of the advertisements.

Implementations can include one or more of the following features. A privacy policy can be enforced to allow outputting of aggregate information derived from the first and second data logs regarding on-line behavior of a plurality of users and not allow outputting of information derived from the first and second data logs regarding on-line behavior of an individual user or a group of less than a threshold number of users. Effectiveness of an advertisement can be determined based on aggregate information derived from comparing page link analysis histories of users who have received the advertisements and page link analysis histories of users who have not received the advertisements, the aggregate information being associated with many users and cannot be traced to any individual user.

Users can opt-in to receive page link analysis information about web sites they visit using methods selected by the users, for example, using a web toolbar. Effects of an advertisement can be determined by comparing page link analysis histories of users who have received the advertisement with page link analysis histories of users who have not received the advertisement. Comparing page link analysis histories of users who have received the advertisement with page link analysis histories of users who have not received the advertisement can include selecting a first user who has received the advertisement, identifying a second user who has not received the advertisement in which the second user has an on-line behavior profile that matches that of the first user, and comparing the page link analysis histories of the first and second users. An ad campaign can be adjusted based on the effects of the advertisement.

The first data log can include records, each record including a first identifier that identifies a web page for which page link analysis information was requested, a time stamp, and a second identifier that identifies a user who visited the web page at a time represented by the time stamp. Records can be removed when the records are related to addresses associated with internet service providers that use one or more common addresses each representing a plurality of user addresses. The second data log can include records, each record including an identifier of an advertisement, an identifier of the page on which this advertisement was served, and a time stamp indicating that the advertisement was delivered to a user associated with the address at a time represented by the time stamp.

The first data log and the second data log can be merged to generate a merged data log having records, each record including a time stamp, an identifier associated with a user, an identifier of an advertisement, and an identifier of a web page. Merging the first and second data logs can include merging a record of the first data log and a record of the second data log, the record of the first data log indicating that a user associated with an address browsed a web page associated with an identifier at a first time indicated by a first time stamp, the record of the second data log indicating that an advertisement was delivered to the address at a second time indicated by a second time stamp, and the difference between the first time and the second time is less than a predetermined threshold.

The first data log can be established based on identifiers of web sites and time stamps submitted by the users, each of the time stamps indicating when a user requested page link analysis information for a web site associated with the time stamp. In response to receiving the identifiers of web sites and time stamps from the users, information about the web sites can be provided. Providing information about the web sites can include providing page link analyses of the web sites. The advertisements can include at least one of text advertisements, audio advertisements, video advertisements, Flash advertisements or any other type of online advertisement.

In general, in another aspect, a page link analysis history of a user who has received a particular on-line advertisement is determined by correlating page link analysis histories of a plurality of users with delivery histories of a plurality of on-line advertisements that include the particular on-line advertisement.

Implementations can include one or more of the following features. The page link analysis histories of users can be established based on universal resource locators (URLs) of web sites, time stamps, and internet protocol (IP) addresses provided by the users, the time stamps indicating when the users visited the web sites. The delivery histories of the on-line advertisements can be received from one or more advertisement computer servers that deliver the on-line advertisements to the users. The delivery histories of the on-line advertisements can include records, each record including an identifier of an advertisement, an internet protocol (IP) address, and a time stamp indicating that the on-line advertisement was delivered to a user associated with the IP address at a time represented by the time stamp.

In general, in another aspect, effectiveness of an on-line advertisement is determined by merging web browsing information received from users with advertisement delivery information received from advertisement servers, and comparing web browsing behaviors of users who have received the advertisement with those of users who have not received the advertisement.

Implementations can include one or more of the following features. Whether users who have received an advertisement are more likely request page link analysis information for a specified web page after receiving the advertisement compared to users who have not received the advertisement is determined. Whether users who have received an advertisement are more likely to purchase a specified product after receiving the advertisement compared to users who have not received the advertisement is determined. Survey opinions from users are identified, and differences in opinions of users who have received an advertisement and users who have not received the advertisement are determined.

In general, in another aspect, a storage stores a first data log having information about page link analysis histories of users, and a second data log having information about delivery histories of advertisements; and a data processor correlates the first data log with the second data log to infer page link analysis histories of users who have received a particular one of the advertisements.

Implementations can include one or more of the following features. The data processor can merge the first data log and the second data log to generate a merged data log having records, each record including a time stamp, an address associated with a user, an identifier of an advertisement, and an identifier of a web page. The data processor can correlate the first data log with the second data log to infer page link analysis histories of users who have not received the particular advertisement. The data processor can determine effects of an advertisement by comparing page link analysis histories of users who have received the advertisement with page link analysis histories of users who have not received the advertisement. The data processor can select a first user who has received the advertisement, identify a second user who has not received the advertisement in which the second user has an on-line behavior profile that matches that of the first user, and compare the page link analysis histories of the first and second users. The data processor can merge the first data log and the second data log to generate a merged data log having records, each record including a time stamp, an address associated with a user, an identifier of an advertisement, and an identifier of a web page. A page link analysis server can generate the first data log and provide page link analyses of web sites in response to page link analysis requests. An ad server can generate the second data log and deliver the advertisements.

In general, in another aspect, a first data has information about page link analysis histories of users; a second data log has information about delivery histories of advertisements; and a data processor determines a page link analysis history of a user who has received a particular on-line advertisement by correlating page link analysis histories of a plurality of users with delivery histories of a plurality of on-line advertisements that include the particular on-line advertisement.

Implementations can include one or more of the following features. The data processor establishes the page link analysis histories of users based on universal resource locators (URLs) of web sites, time stamps, and internet protocol (IP) addresses provided by the users, the time stamps indicating when the users visited the web sites.

In general, in another aspect, an ad campaign optimizing engine merges web browsing information received from users with advertisement delivery information received from advertisement servers, and compare web browsing behaviors of users who have received an on-line advertisement with those of users who have not received the advertisement to determine effectiveness of the advertisement to users.

Implementations can include one or more of the following features. An advertising campaign can be automatically adjusted based on effects of the advertisement to users.

In general, in another aspect, a system includes means for identifying a first data log having information about page link analysis histories of users; means for identifying a second data log having information about delivery histories of advertisements; and means for correlating the first data log with the second data log to infer web browsing patterns of users who have received the advertisements and web browsing patterns of users who have not received the advertisements.

These and other aspects and features, and combinations of them, may be expressed as methods, apparatus, systems, means for performing functions, program products, and in other ways.

Advantages of the aspects and features include one or more of the following advantages. An ad campaign can be optimized in real time throughout the duration of the ad campaign. An advertiser does not need to wait until the end of the ad campaign to gather data for use in improving a future ad campaign. An advertiser does not have to select the criteria for classifying the users in order to identify a segment of users for which the ad is most effective; rather, the system can automatically determine the proper criteria for segmenting the users. The final user segmentation does not need to be known at the start of the ad campaign. The system can find categories of users for which the advertisement has a high effectiveness in which the advertiser may not be aware of the categories prior to optimization of the ad campaign. The virtual panel can include a large number (e.g., millions) of users that are representative of a large percentage of all on-line users, so that the effectiveness or impact of ads on various users can be determined more accurately, and advertising money can be spent more effectively. Users can also have better user experiences because they can receive more relevant ads. The virtual panel thus created can be less biased than manually selected panels.

The details of one or more embodiments are set forth in the accompanying drawings and the description below. Other features, objects, and advantages of the invention will be apparent from the description and drawings, and from the claims.

DESCRIPTION OF DRAWINGS

FIG. 17 is a schematic representation of a general computing system.

Like reference symbols in the various drawings indicate like elements.

DETAILED DESCRIPTION

Figure 1:
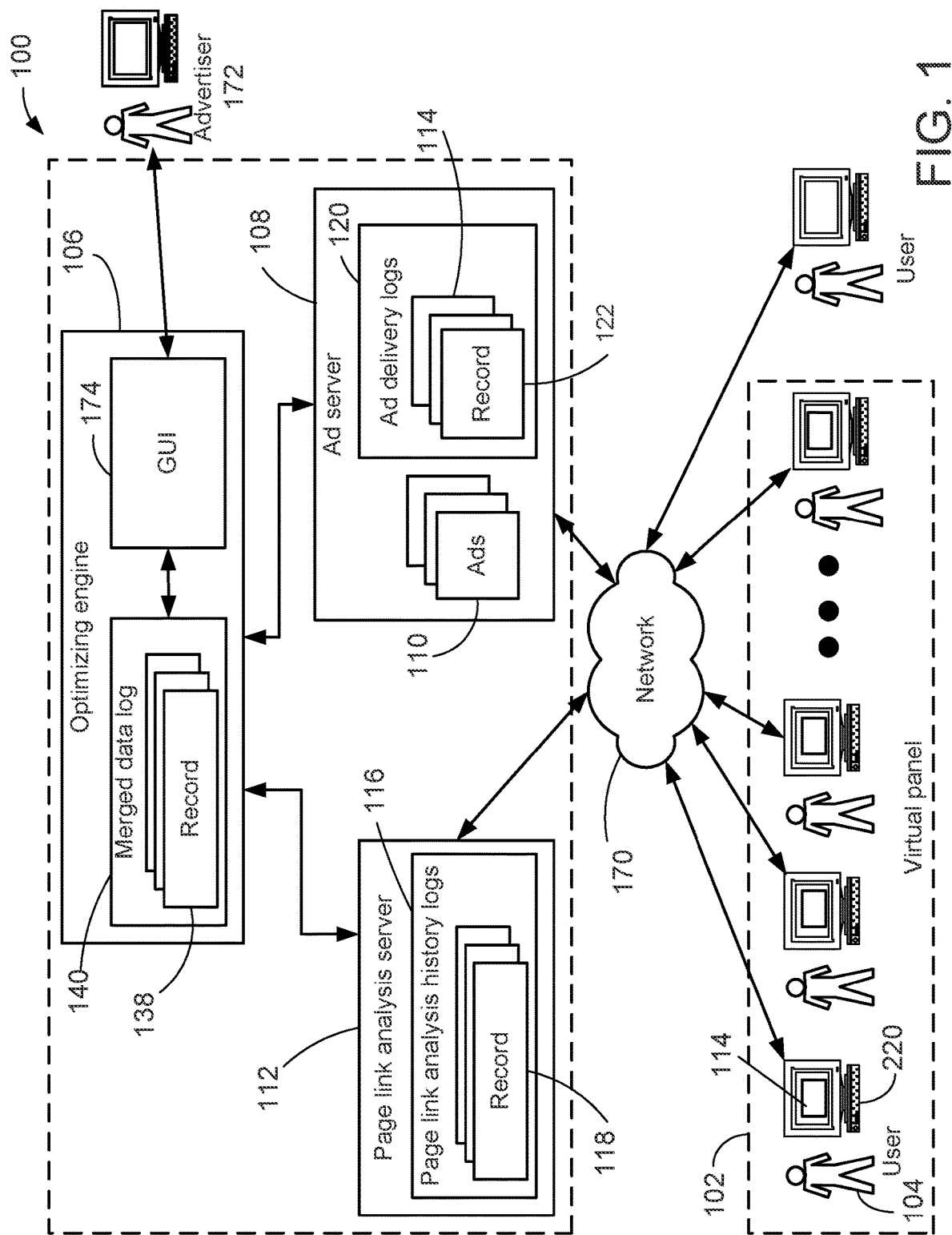
FIG. 1 is a diagram of an example system for optimizing ad campaigns.

FIG. 1 is an example system 100 for optimizing ad campaigns in real-time to increase effectiveness of advertisements 110 by using information gathered, for example, from a "virtual panel" 102 of users. The virtual panel 102 includes users 104 who use one or more application programs that provide page link analysis browser request data, which can be used to infer demographics for users' web browsing history data while preferably preserving the privacy of individual users and their browsing history. Other methods of gathering effectiveness data can also be used. The system 100 includes an optimizing engine 106 that correlates the web browsing history data with ad delivery history data received from one or more ad servers 108 to determine how on-line behaviors of users are affected by the ads 110. Using this information, the optimizing engine 106 adjusts the ad campaigns to increase the overall effectiveness of the ads 110. The virtual panel 102 can include a large number (e.g., thousands or millions) of users, allowing the system 100 to more accurately determine the impact of the ads 110 on users 104 so that advertising money can be spent more effectively. Users 104 can also have a better experience by receiving more relevant ads 110. Users 104 can also have privacy preserved through the application programs obfuscation of individually identifying information or other personal information during browsing history collection, through the introduction of noise into web browser logs, or through other privacy protecting mechanisms.

A feature of the system 100 is that an ad campaign can be optimized in real time throughout the duration of the ad campaign. For example, the ad campaign may run for a month, targeting ads on selected web sites. The system 100 may run the ad campaign and evaluate effectiveness of the ad periodically (e.g., each hour, day, or week) and adjust the ad campaign accordingly, so that the targeted web sites may change from hour to hour, day to day, or week to week. The duration between updates may depend on the amount of data gathered by the system 100. For example, the number of times that the ad delivered may have to exceed a threshold in order to meaningfully evaluate the effectiveness of the ad on various web sites or categories of users 104. By using the system 100, an advertiser 172 does not need to wait until the end of the ad campaign to gather data for use in improving a future ad campaign.

In some implementations, a user 104 may use a client device 220 to access web pages provided by publishers 230, and use a page link analysis tool 114 that provides page link analysis information on the web pages visited by the user 104 to allow evaluation of the importance of the web pages. For example, the user 104 may use a Google Toolbar and activate the PageRank™ feature. As the user 104 visits various web pages, the page link analysis tool 114 sends the universal resource locators (URLs) of the web pages, time stamps indicating the time that the user 104 visited the web pages, and an address, such as an Internet Protocol (IP) address, of the user 104 to a page link analysis server 112, preferably filtered or anonymized to preserve the privacy of individual users. In response, the page link analysis server 112 determines the page link analysis of the web pages associated with the URLs and sends the page link analysis results to the page link analysis tool 114 associated with the user 104. The page link analysis tool 114 then displays the page link analysis results.

The URL, time stamp, and IP address associated with each web page visited by each user 104 are stored in a record 118 of page link analysis history logs 116 in the page link analysis server 112, preferably filtered or anonymized to preserve the privacy of individual users. Collectively, the page link analysis history logs 116 include records 118 having information about the URLs of web pages visited by the users 104 of the virtual panel 102 and time stamps indicating when the users 104 visited the web pages.

When the user 104 visits the web pages, the ad sever 108 may deliver ads 110 to the user 104 so that the user 104 sees the ads 110 along with other contents of the web pages. The ad server 108 keeps ad delivery logs 120 that include records 122 each having an identifier of an ad 110 that was delivered, a time stamp indicating when the ad 110 was delivered, and an IP address indicating where the ad 110 was delivered.

The page link analysis history logs 116 have information indicating which web page a user 104 visited at a particular time. The ad delivery logs 120 include information indicating which ad was delivered to which address at a particular time. The optimizing engine 106 matches a record 118 of the page link analysis history logs 116 with a record 122 of the ad delivery logs 120 in which the IP address in the record 118 is the same as that of the record 122, and the time stamp in the record 118 indicates a time that is the same as or close to that indicated by the time stamp of the record 122. In some examples, only part of the IP address is matched to a user (for example, only the class A and class B space), while in other examples entire IP address is matched to a user or multiple users can be mapped to a single IP address.

By performing the correlation, the optimizing engine 106 has information about the web page that the user 104 was visiting when a particular ad was delivered to the user 104. The optimizing engine 106 has the web browsing history of the user 104 before receiving the ad 110 and the web browsing history after receiving the ad 110. Because the virtual panel 102 includes many users 104, the optimizing engine 106 can effectively compare users 104 who have been exposed to the ad 110 and users 104 who have not been exposed to the ad 110, and examine the differences in on-line behaviors of the two groups of users 104 to determine ad effectiveness.

The system 100 can generate reports having information about how users' behaviors changed after being exposed to the ad 110. The reports are generated based on aggregate information from the users 104 that preferably cannot be traced to individual users. In some implementations, noise representing data about dummy users can be inserted into the data logs so that it is very difficult, if not impossible, to revert the aggregate data back to individual data from the web browsing history logs 116. This ensures privacy of the users 104. The reports can be provided to an advertiser 172 (sponsor of the ad 110) through a graphical user interface 174.

The system 100 and the users 104 are connected to a network 170, which can be, e.g., the Internet.

Figure 2:
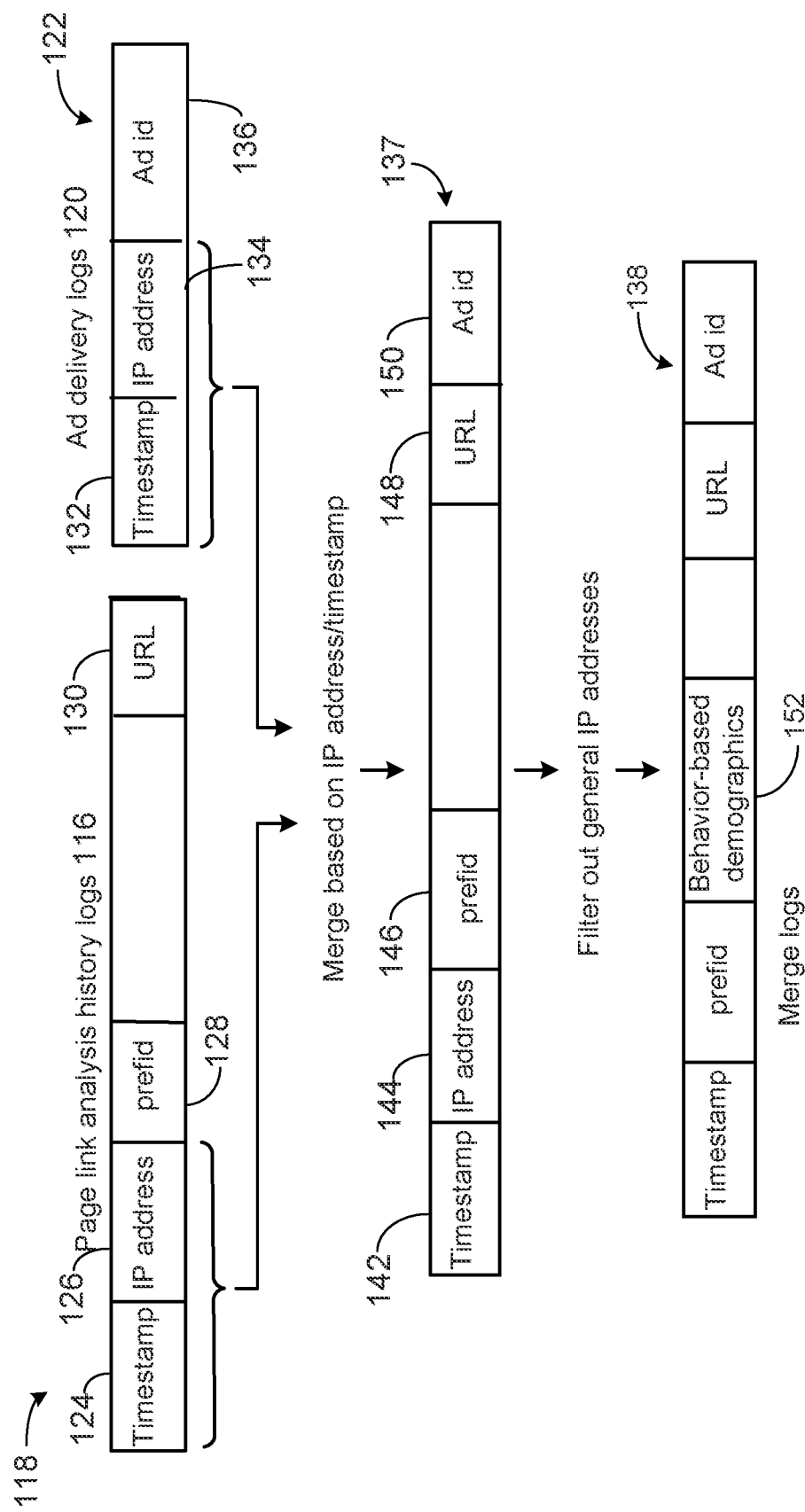
FIG. 2 is a diagram of data logs.

Referring to FIG. 2, as an example, the page link analysis history logs 116 include records 118. Each record 118 can include, e.g., a timestamp 124, an IP address 126, a prefid 128, and an URL 130. The prefid 128 can be, e.g., an identifier of the page link analysis tool 114. The ad delivery logs 120 include records 122. Each record 122 can include, e.g., a timestamp 132, an IP address 134, and an ad identifier 136.

The record 118 and the record 122 can be merged based on matching of the IP addresses and timestamps to generate an intermediate merged record 137. The criteria for merging a record 118 and a record 122 is that the IP addresses of the records 118 and 122 are the same, and the difference in timestamps of the records 118 and 122 is smaller than a predetermined threshold, indicating that the ad 100 was delivered to the user 104 at approximately the same time that the user 104 visited a particular web page.

The intermediate merged records 137 are stored in a merged data log 140 at the optimizing engine 106. Each merged record 137 includes a timestamp 142, an IP address 144, a prefid 146, an URL 148, and an ad identifier 150. The timestamp 142 can be equal to, e.g., the timestamp 124, the timestamp 132, or the average of the timestamps 124 and 132. The IP address 144 is the same as the IP address 126, which is the same as the IP address 134. The prefid 146 is the same as the prefid 128, the URL 148 is the same as the URL 130, and the ad identifier 150 is the same as the ad identifier 136.

Some users 104 may access the Internet through Internet service providers that use common IP addresses for several users 104. For such users 104, it is difficult for the optimizing engine 106 to determine which ad 110 is sent to which user 104 because many users 104 share the same IP address. The optimizing engine 106 keeps a list of such "general" IP addresses in which each general IP address corresponds to a large number of users. The intermediate merged records 137 having IP addresses that correspond to general IP addresses are filtered and removed from the merged data logs 140. The final merged data log 140 includes merged records 138 in which there is a high probability that each merged record 138 includes information associated with an individual user 104.

Each of the merged records 138 can include a behavior-based demographic profile 152 that is generated by the optimizing engine 106. For example, users 104 whose on-line activities have certain characteristics may be associated with a particular demographic profile. For example, users 104 who frequently visit on-line multi-user gaming web sites are likely to be young users (e.g., having ages less than 40), whereas users who frequently visit web sties providing information about retirement plans are likely to be older users (e.g., having ages above 40).

Figure 3:
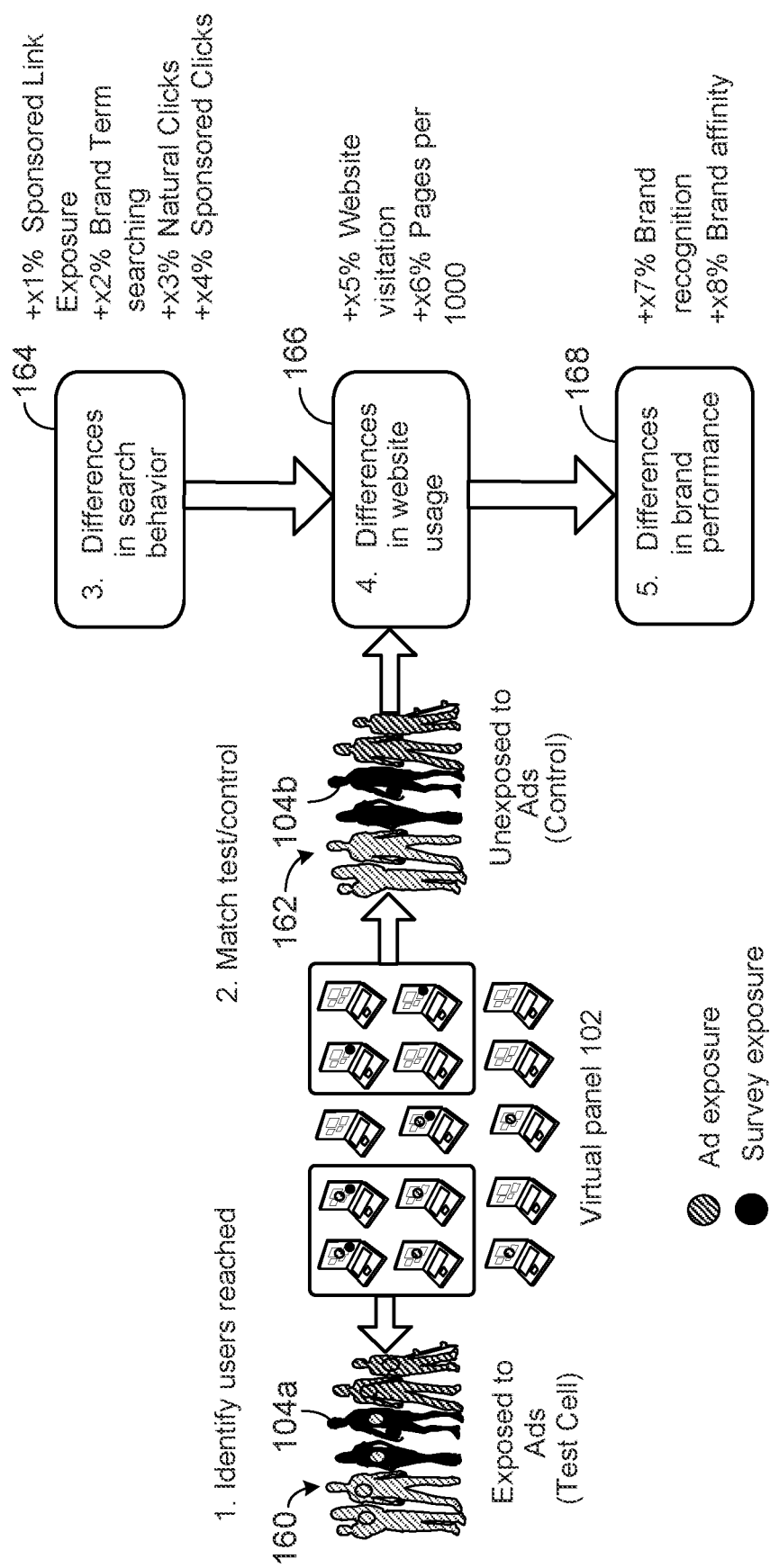
FIG. 3 is a diagram showing differences in user behaviors due to exposure of ads.

Referring to FIG. 3, based on the merged data log 140, the system 100 identifies a group 160 of users 104*a* of the virtual panel 102 who have been exposed to the ad 110. Also based on the merged data log 140, the system 100 identifies a control group 162 (or test group) of users 104*b* in the virtual panel 102 who have not been exposed to the ad 110. To make the comparison more meaningful, the system 100 matches each user 104*a* in the group 160 with a user 104*b* in the group 162 who is similar to the user 104*a*.

For a given user 104*a*, a number of methods can be used to select a user 104*b* who is similar to the user 104*a*. For example, similarity can be determined according to the behavior-based demographic profile 152 provided in the merged records 138. For example, a user 104*a* in the group 160 who is male and has an age between 10 to 20 may be matched with a user 104*b* in the group 162 who is also a male and has an age between 10 to 20.

The similarity can also be determined according to on-line behaviors that are not associated with demographic profiles. The on-line behaviors can include web browsing patterns, purchasing patterns, and opinions in response to on-line surveys, etc. For example, a user 104*a* in the group 160 who frequently visits a particular set of websites can be matched with a user 104*b* in the group 162 who also frequently visits the same particular set of websites. The users 104*a* and 104*b* may not easily fit within any traditional demographic profile (e.g., based on age, gender, education level, income level, etc.).

The on-line behavior of the user 104*a* for a time period after receiving the ad 110 is compared with the on-line behavior of the user 104*b* during roughly the same time period. The results of the comparison of many users in groups 160 and 162 are aggregated to provide information about the effectiveness of the ad 110.

For example, the comparison may indicate differences in search behavior 164. After seeing the ad 110, there may be varying degrees of increases in, e.g., sponsored link exposure (e.g., the user is shown particular sponsored links more often), brand term searching (e.g., the user searches for particular brand terms more often), natural clicks (e.g., the user clicks on particular non-sponsored items in search results lists more often), and sponsored clicks (e.g., the user clicks on particular sponsored items in search results lists more often), etc.

For example, the comparison may indicate differences in website usage 166. After seeing the ad 110, there may be varying degrees of increases in, e.g., website visitation and page exposure.

For example, the comparison may indicate differences in brand performance 168. After seeing the ad 110, there may be varying degrees of increases in, e.g., brand recognition and brand affinity.

Figure 4:
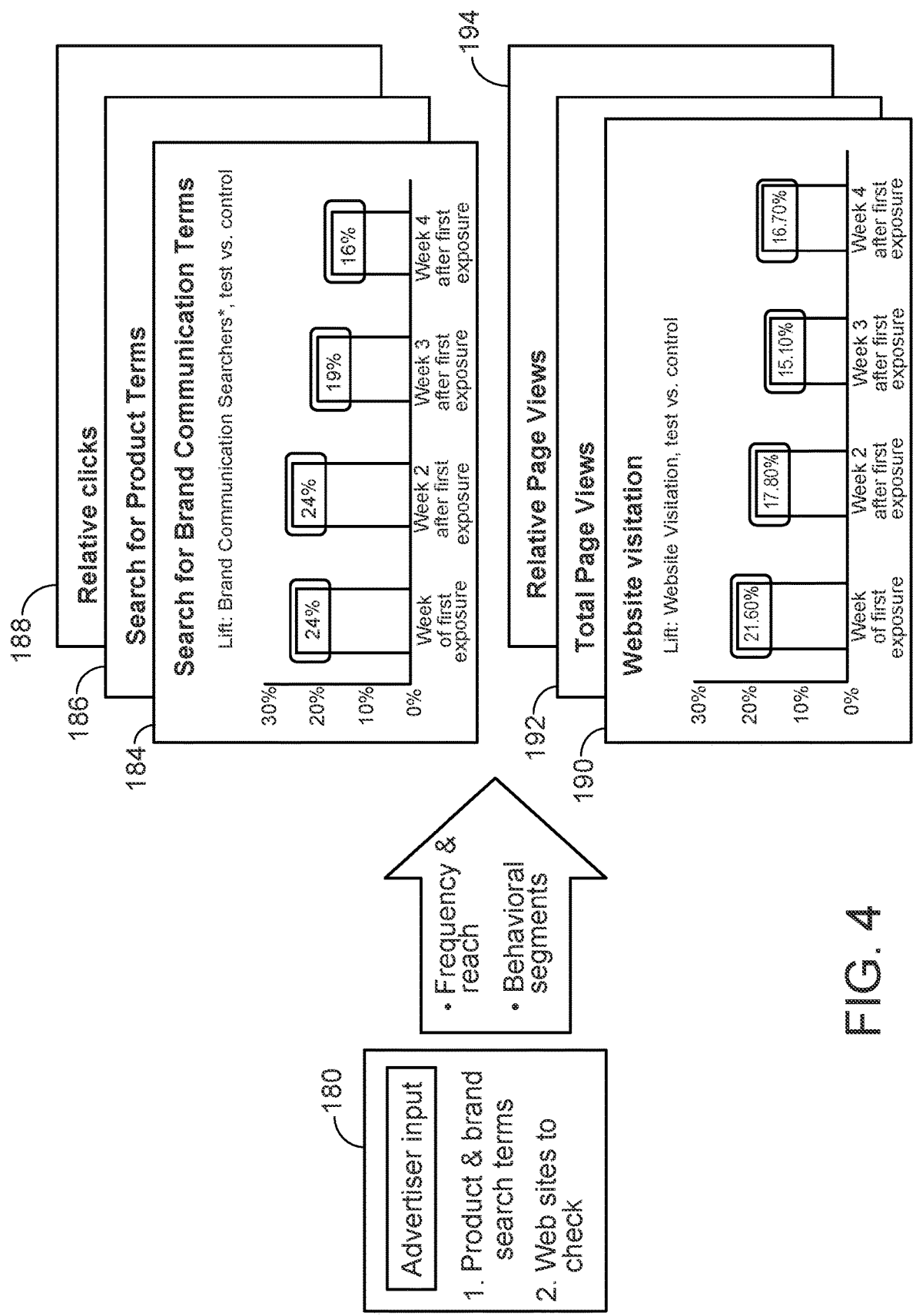
FIGS. 4 and 5 show reports.

Referring to FIG. 4, in some implementations, when the advertiser 172 initially sets up an ad campaign, the advertiser 172 provides, e.g., the product and brand search terms and the web sites to check. The system 100 runs the ad campaign for a period of time, collects web browsing history data (based on page link analysis requests) from the users 104 and ad delivery history data from the ad servers 108, and generates merged data logs 140 that have information about web browsing history of users 104 who received a particular ad 110. The system 100 compares users 104*a* who have received the ad with users 104*b* who have not received the ad, and generates reports showing the results of the comparison.

Various reports showing the effects of the ad 110 on users can be generated. For example, a report 184 can show the lift or increase in searches for brand communication terms. A report 186 can show the lift in search for product terms. A report 188 can show the lift in relative clicks. A report 190 can show the lift in website visitation. A report 192 can show the lift in total page views. A report 194 can show the lift in relative page views.

The reports 184 to 194 are generated using aggregated user information that cannot be traced back to individual users to ensure user privacy. The system 100 may enforce a privacy policy such that if the number of relevant users is less than a threshold, a report will not be generated. For example, if the advertiser 172 wants to know whether users searched for a particular brand term after seeing the ad 110, and the merged data log 140 included records from only five users 104 who have searched for the particular brand term, the system 100 may generate a message saying there is not sufficient data to render a report.

Figure 5:
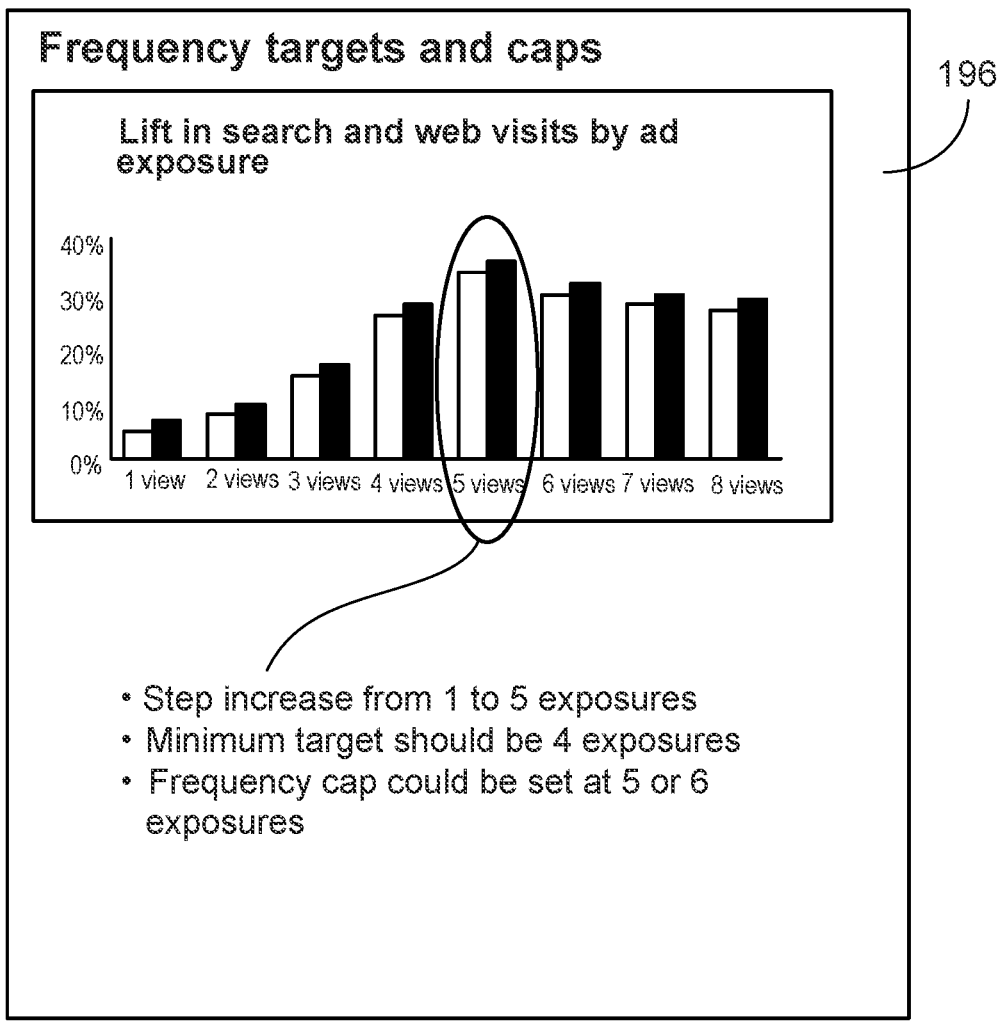

Referring to FIG. 5, in some implementations, a report 196 can be generated to show the number of exposures that result in a high effectiveness. In this example, the lifts in search and web visits due to ad exposure increase gradually from 1 to 5 exposures, and levels off after 5 or 6 exposures. This indicates that showing the ad repeatedly to the same user may increase the effectiveness of the ad for up to 5 exposures. The minimum target should be 4 exposures, and the frequency cap can be set at 5 or 6 exposures.

Figure 6:
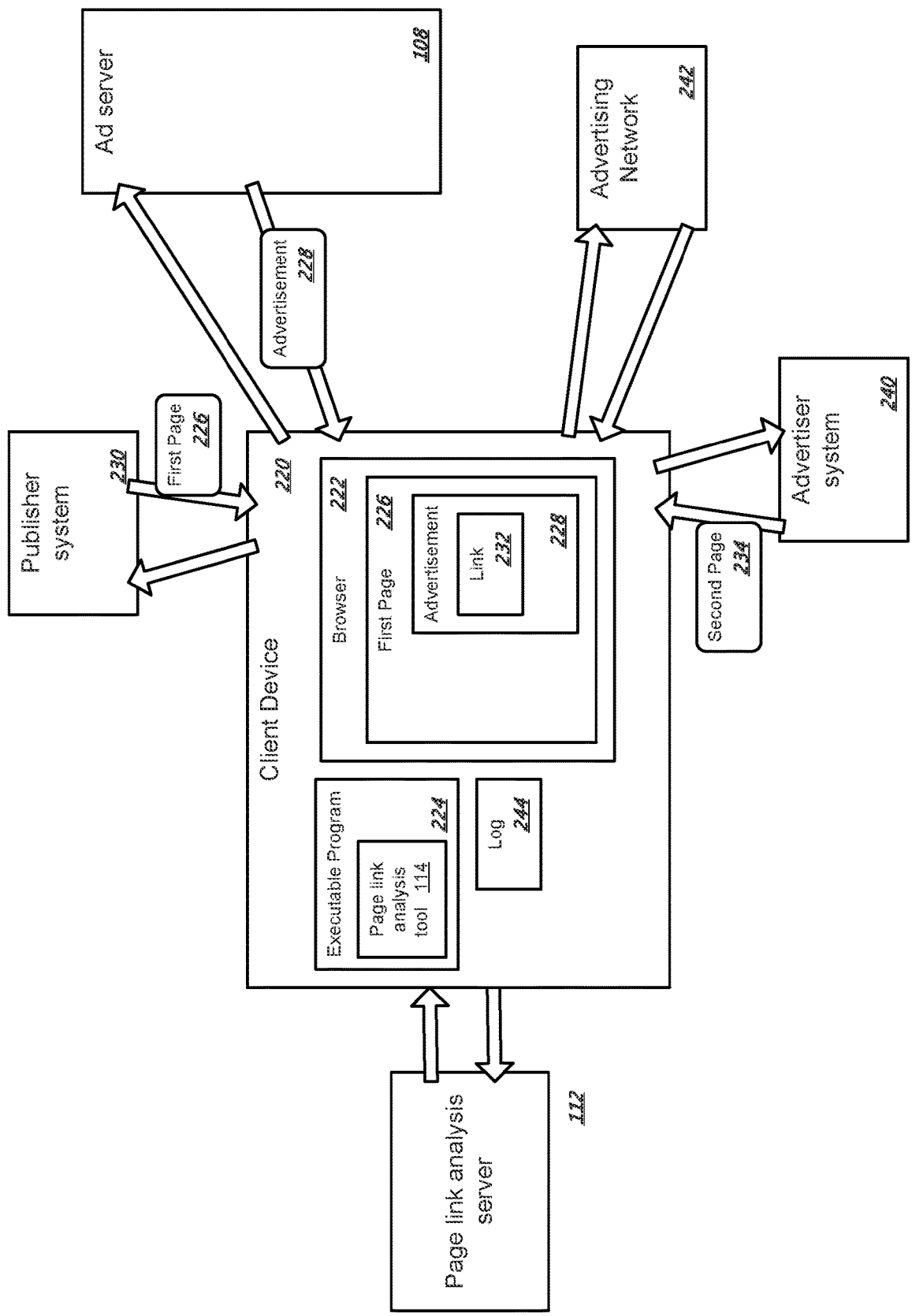
FIG. 6 is a diagram of an example client device and apparatuses that interact with the client device.

Referring to FIG. 6, an example client device 220 interacts with publisher systems 230 (operated by publishers), advertiser systems 240 (operated by advertisers), an advertising network 242, the page link analysis server 112, and the ad server 108. A user 104 can use the client device 220 to access the web pages provided by the publisher systems 230. The client device 220 can be a processor-operated device, including a personal computer, a handheld device or a cellular telephone, to name a few examples. In some implementations, the client device 220 includes a browser 222 that is capable of presenting content and related content (e.g., ads). The browser 222 may be, for example, a web browser, an electronic mail (e-mail) application, a streaming media player, or other content presentation device.

The publisher system 230 can be operated by a publisher who seeks to publish one or more pages in an online context, such as a merchant's web page or a page with results of an online search. In some examples, the ad server 108 can be configured to provide the publisher's page(s) with one or more advertisements to be presented together with the page. The advertisement(s) can originate from the advertiser system 240, and the advertisement(s) can be configured so that when a user 104 clicks on (or otherwise activates) the ad 110, the browser 222 is ultimately redirected to the advertiser system 240. The advertising network 242 can serve an intermediary or broker role between the presented advertisement(s) 110 and the advertiser system 240. That is, upon user activation of the advertisement 110, the browser 222 can first be directed to the advertising network 242 and from there (via zero or more additional redirections) to the advertiser system 240, to name just one example.

The ad server 108 can present advertisements 110 on behalf of the advertiser system 240 to users 104 at the client devices 220. The ad server 108 can provide storage for the advertisements 110 and network bandwidth to deliver the ads 110. Each advertisement can contain one or more links that, when selected by a user 104 at the client device 220, ultimately direct the user 104 to the advertiser system 240. The client device 220 can store redirection information sent by the ad server 108 and/or the advertising network 242 that direct the user 104 to the advertiser system 240.

The client device 220 includes an executable program (such as a search toolbar) having a number of components, including a page link analysis tool 114. The executable program 224 can be configured to record addresses, such as Uniform Resource Identifiers or Internet Protocol addresses, of content and advertisements presented within the browser 222. The executable program 224 may be a stand-alone application and/or a plug-in or add-on to another application, such as the browser 222. In some implementations, the executable program 224 is configured to collect data only if the user 104 of the client device 220 opts in to the data-collection procedure. In other words, data collection in such implementations may be prevented absent explicit user approval.

The executable program 224 may interface with the browser 222 to determine the addresses of the content and ads. As another example, the executable program 224 may use information external to the browser 222 to determine the addresses of the content and ads in the browser 222, such as by monitoring communication on a particular network port of the client device 220 (e.g., port 80). When the page link analysis tool 114 is activated by the user 104, the executable program 224 can provide information (such as the addresses of the content) to the page link analysis server 112 for it to analyze the information. The page link analysis tool 114 can request page link analysis information, and in response, the page link analysis server 112 determines the page link analyses of the web pages associated with addresses, and sends the page link analysis results to the page link analysis tool 114.

In some examples, a user 104 makes an input within the browser 222 requesting a first page 226 from the publisher system 230. The publisher system 230 provides the first page 226 to the browser 222. The publisher system 230 may be the originator of a web site, such as an online news site or an Internet search site, configured to present at least one web page with one or more ads to the user 104 through the browser 222. As another example, the publisher system 230 may provide other types of content and ads to the browser 222, such as e-mail or streaming media. The publisher system 230 may provide the first page 226 to the client device 220 over a network or the publisher system 230 may provide the first page 226 to the client device 220 on removable media, such as through a postal system.

The first page 226 is configured to include an advertisement 228. For example, the page 226 can include instructions that request the advertisement 228 from the ad server 108. For example, a web page may include a script that dynamically retrieves the advertisement 228 from the ad server 108. As another example, the publisher 230 may provide the advertisement 228 included in the first page 226.

The ad server 108 can provide the advertisement 228 to the browser 222. In certain implementations, the ad server 108 may also act as a publisher and provide the first page 226 to the browser 222. In such implementations, the ad server 108 can receive the page 226 from the publisher system 230 before providing it and the advertisement 228 to the user 104. The advertisement 228 can include a link 232 that, when activated by a user 104, ultimately directs the browser 222 to a second page 234, such as a web site provided by the advertiser system 240.

The user 104 makes an input within the browser 222 to activate the link 232, which sends a request to the ad sever 108 according to the specification(s) of the advertisement 228. For example, the request can explicitly identify the second page 234 to be provided or the ad server 108 can identify an intermediary redirection address or the ultimate target page using other information included in the request. In certain implementations, the ad server 108 uses information contained in the request from the link 232 to process billing arrangements between the ad server 108, the publisher system 230, and/or the advertising network 242 for advertisement serving and/or publishing services. The ad server 108 sends a redirection command to the browser 222 that in this example directs the browser 222 to the advertising network 242. In the case of a link to web content, the redirection command may be a Hypertext Transfer Protocol (HTTP) redirection status code, such as HTTP code 301 or HTTP code 302.

The executable program 224 records the redirection received from the ad server 108 in a log 244. In some implementations, the executable program 224 may analyze scripts, executable code, embeds, or multimedia content such as audio or video associated with the advertisement to determine the redirection. The executable program 224 may identify the server 108 as a particular ad server. For example, the executable program 224 may determine if an address within the link 232 matches an address contained in a predetermined list of ad server addresses. As another example, the ad server 108 may be identified using other information contained in the advertisement 228 or the first page 226, such as a source address from which to retrieve a script that generates the advertisement 228. In certain implementations, the executable program 224 records redirection information when the user 104 selects the link 232 and the link 232 is identified as being associated with the ad server 108.

In response to receiving the redirection from the ad server 108, the browser 222 sends a request to the advertising network 242. For example, the request can explicitly identify the second page 234 to be provided or the advertising network 242 can identify an intermediary redirection address or the ultimate target page using other information included in the request. In certain implementations, the advertising network 242 uses information contained in the request from the browser 222 to process billing arrangements between the advertising network 242, the ad server 108, and/or the advertiser system 240 for advertisement serving and/or placement services. The advertising network 242 sends a redirection command to the browser 222 that directs the browser 222 to the advertiser 240. As another example, the advertising network 242 may send the second page 234 to the client device 220 instead of the redirection.

The executable program 224 can record in the log 244 any redirection sent by the advertising network 242. The executable program 224 can identify the network 108 as a particular advertising network. For example, an address included in the redirection command from the ad server 108 may be compared to addresses in a predetermined list of advertising network addresses to identify the advertising network 242.

The browser 222 receives the redirection from the advertising network 242 and sends the request for the second page 234 to the advertiser 240. In response, the advertiser system 240 sends the second page 234 to the client device 220 where it is presented by the browser 222. In the described example, the user's navigation from the first page 226 to the second page 234 is now complete.

The executable program 224 may record, in the log 244, information about the advertiser 240, the advertising network 242, the second page 234 and/or other information. The executable program 224 may identify the system 240 as a particular advertiser system. For example, an address included in the redirection command from the advertising network 242 may be compared to addresses in a predetermined list of advertiser addresses to identify the advertiser 240. The executable program 224 may also record information about a transaction that occurs at the second page 234, such as a purchase or a request for a quote.

When the page link analysis tool 114 is activated, each time the user 104 visits a new web page, the page link analysis tool 114 sends the address of the web page to the page link analysis server 112 in order to receive the page link analysis results of the web page.

In some examples, the redirection command is received in response to a user 104 activating a link or other navigation element. In other implementations, redirection commands can be received and/or processed without necessarily being preceded or triggered by a link activation. The executable program 224 can be configured to not only record redirects from clicks, but also to record redirects triggered by any or all content referenced by a page. For example, such a program need not wait for the user 104 to click to find ad networks and ad servers, but can rather follow the redirects the browser 222 is already undergoing to render the ad on the page. Other redirect commands than those described in these examples can be used.

In some implementations, the executable program 224 can remove user identification information from the log 244, such as to make the log 244 anonymous and/or to protect the privacy of the user. For example, user identification information can be filtered out completely, associated with a unique report identifier that is not associated with the user, filtered out upon aggregation of data for advertiser network reporting, maintained or excluded based on user privacy and/or reporting preferences, and/or stored in another time-limited, identity-filtered or restricted-access fashion.

The page link analysis server 112 can use the information from the log 244 and/or logs from other users of the client device 102 or other client devices to generate page link analysis history logs 116.

Figure 7:
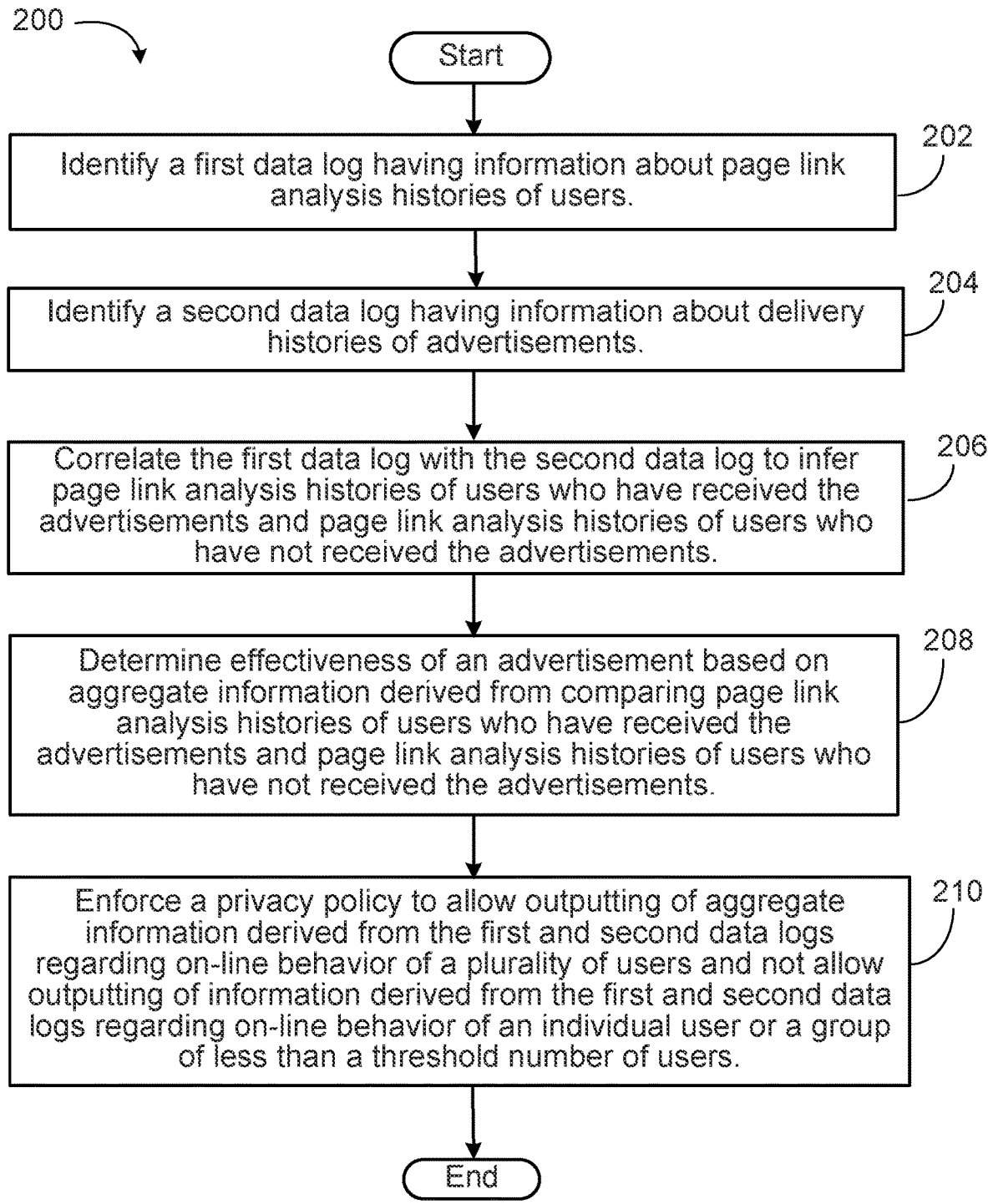
FIG. 7 is a flow diagram of an example process.

FIG. 7 is a flow diagram of an example process 200 for determining effectiveness of an ad. A first data log having information about page link analysis histories of users is identified (202). A second data log having information about delivery histories of advertisements is identified (204). The first data log is correlated with the second data log to infer page link analysis histories of users who have received the advertisements and page link analysis histories of users who have not received the advertisements (206).

Effects of an advertisement is determined by comparing page link analysis histories of users who have received the advertisement with page link analysis histories of users who have not received the advertisement (208). The effects of the advertisement may include, for example, changes in sponsored link exposure, brand term searching, natural clicks, sponsored clicks, website visitation, brand recognition, and brand affinity, etc.

A privacy policy is enforced to allow outputting of aggregate information derived from the first and second data logs regarding on-line behavior of a plurality of users and not allow outputting of information derived from the first and second data logs regarding on-line behavior of an individual user or a group of less than a threshold number of users (210).

Optimization of an ad campaign does not necessarily have to involve a virtual panel 102 of users 104 as shown in the example of FIG. 1. Other ways of determining effectiveness of an ad 110 can also be used.

Figure 8:
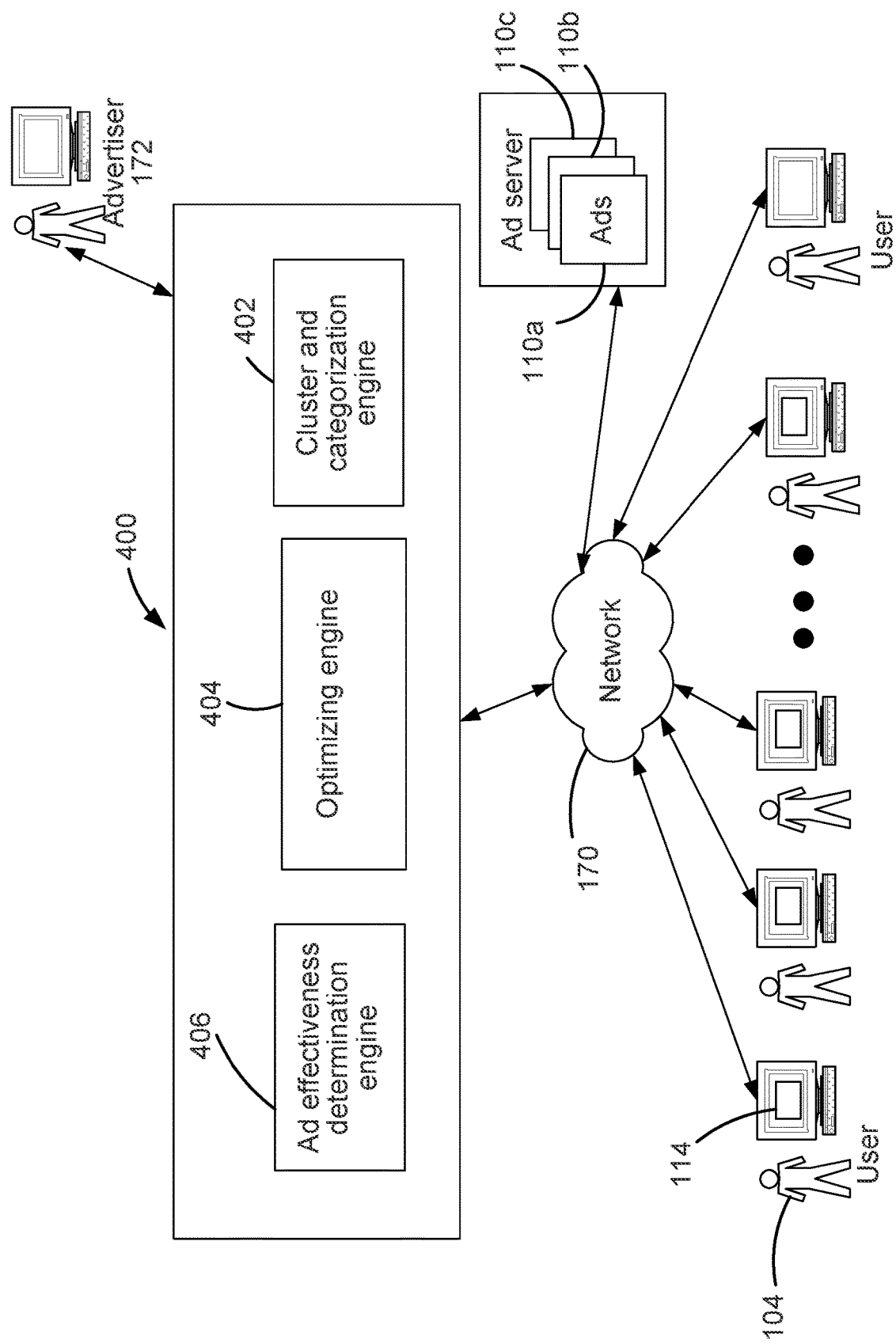
FIG. 8 is a diagram of an example system for optimizing ad campaigns.

FIG. 8 is an example system 400 for optimizing an ad campaign to increase effectiveness of an advertisement 110 by iteratively determining the effectiveness of the advertisement on various categories of users 104 and automatically adjusting the advertising campaign based on the determination.

For example, the ad campaign may initially target a set of websites. The ad campaign is executed for a period of time. A cluster and categorization engine 402 classifies the users 104 who visited the targeted set of websites and received the advertisement 110 into various categories according to, for example, one or more characteristics of on-line activities of the users 104. An ad effectiveness determination engine 406 determines the effectiveness of the ad on the various categories of users. The cluster and categorization engine 402 clusters the categories according to the effectiveness of the categories. For example, categories having higher effectiveness are clustered together, and categories having lower effectiveness are clustered together. Each cluster is assigned an effectiveness value.

An optimizing engine 404 adjusts the ad campaign to target users who belong to the cluster having the highest effectiveness. The optimizing engine 404 may identify additional web sites that have not been targeted and were frequently visited by the users who belong to the cluster having the highest effectiveness. The additional websites may be added to the list of websites that are targeted by the ad campaign.

The process of executing the ad campaign for a period of time, determining the effectiveness of the ad on various categories of the users 104, clustering the categories based on effectiveness, identifying other websites visited by users of the clusters with high effectiveness, and reconfiguring the ad campaign to include new websites is repeated.

An advertiser 172 does not have to select the criteria for classifying (or segmenting) the users 104 in order to identify a segment (or category) of users 104 for which the ad 110 is most effective. The system 400 automatically determines the proper criteria for segmenting the users 104. For example, the segmentation of users 104 can be based on on-line activities of the users 104, such as web browsing patterns of the users 104, shopping patterns of the users 104, and responses of users to on-line surveys.

In some implementations, the segmentation is based on web sites frequently visited by the users 104. The system 400 identifies the top performing web sites, determines additional sites where users 104 of the top performing sites also visit, and moves ads 110 from lower performing sites to those additional sites. For example, suppose an ad campaign originally targets an ad 110 on web sites A1, A2, A3, and A4. An ad effectiveness determination engine 406 determines that the performances of the ad 110 on web sites A1 and A2 are better than those of web sites A3 and A4. A cluster and categorization engine 402 identifies a group of users U1 who often visit web sites A1 and A2, and determines that the group of users U1 also frequently visit web sites A5 and A6.

This indicates that targeting the ad 110 on web sites A5 and A6 will likely be more effective than targeting web sites A3 and A4 because the ad 110 will more likely be delivered to users 104 who are interested in the ad 110 and would act on the ad 110. An optimizing engine 404 adjusts the ad campaign to target the ad 110 on web sites A1, A2, A5, and A6.

In some implementations, the segmentation is based on characteristics of the users 104. The system 400 identifies a category of users having particular characteristics for whom the ad 110 is more effective, and moves ads 110 from lower performing sites to the sites frequently visited by the category of users. For example, suppose an ad campaign originally targets an ad 110 on web sites B1, B2, B3, and B4. The ad effectiveness determination engine 406 determines that the ad 110 is more effective on a group of users U2 who write blogs frequently and a group of users U3 who respond to on-line surveys saying they prefer coffee of a first brand over coffee of a second brand.

For example, suppose the cluster and categorization engine 402 determines that the web sites most frequently visited by the group of users U2 include web sites B1, B5, and B6. The engine 402 determines that the web sites most frequently visited by the group of users U3 include web sites B7 and B8. The system 400 adjusts the ad campaign to target web sites B1 and B5 to B8, and compare the results with targeting web sites B1 to B4. If targeting web sites B1 and B5 to B8 has better results than targeting web sites B1 to B4, the ad campaign will continue to target web sites B1 and B5 to B8, otherwise the ad campaign reverts back to targeting web sites B1 to B4.

In some implementations, the segmentation of users 104 can be based on several criteria. For example, an ad campaign may have three ads 110a, 110b, and 110c with different creatives, all initially targeted on web sites A1 to A4. The ad effectiveness determination engine 406 may determine that the first ad 110a is most effective on users 104 who visit web sites A1 and A2, the second ad 110b is most effective on users 104 who write blogs frequently, and a third ad 110c may be most effective to users 104 who respond to on-line surveys saying they prefer coffee of a first brand over coffee of a second brand. The system 400 may optimize the ad campaign to target the first ad 110a on web sites A1, A2, A5, and A6, target the second ad 110b on web sites B1, B5, and B6, and target the third ad 110c on web sites B7 and B8. Other criteria for segmentation of users can also be used.

In some examples, the system 400 may determine that the advertisement has a higher effect on a first category of users than a second category of users. The system 400 may identify a third category of users who previously have not been targeted by the advertisement in which users of the first and third categories have similar on-line behaviors. The system 400 increases an advertising budget to target the third category of users.

Because the system 400 automatically finds target audiences based on ad effectiveness information generated by the engine 406 and user categorization information generated by the engine 402, the system 400 can find target audiences that the advertiser 172 may not even be aware of. When using the system 400 to optimize an ad campaign, the final user segmentation does not need to be known at the start of the ad campaign.

The system 400 may be pre-configured with a list of several (e.g., hundreds, thousands, or more) criteria (e.g., on-line behavior characteristics) for which the system 400 can use to classify users. For example, the criteria may include gender of user, age of user, location of user, whether the user writes on blogs frequently, whether the user has a certain response to an on-line survey, etc. When determining which users frequently visit top performing web sites, the system 400 identifies the characteristics of the users based on the list of criteria. For example, the system 400 may determine that users 104 with characteristics c1, c4, and c8 frequently visit the top performing web sites. The system 400 may identify other users with characteristics c1, c4, and c8, identify what additional web sites these other users frequently visit, and target the additional web sites.

In some implementations, the system 400 may select a subset of characteristics from the list of characteristics, and evaluate the effectiveness of the advertisement on various categories of users that are classified based on the subset of characteristics. The subset of characteristics that are evaluated may change from one iteration to another.

For example, suppose there is a set S1 of 10,000 predetermined characteristics that the system 400 can track and evaluate. The system 400 may select a subset S2 of 100 characteristics to evaluate in order to determine which characteristics among the subset S2 of characteristics will result in the highest ad effectiveness. The system 400 evaluates ad effectiveness on users having one or more of the subset S2 of characteristics, determines a group of users U6 for which the ad has the highest effectiveness, and identifies the characteristics associated with the group of users U6. Suppose the group of users U6 have a subset S3 of 30 of the subset S2 of 100 characteristics. The system 400 identifies the other characteristics that the group of users U6 have. Suppose the group of users U6 have a subset S4 of 250 characteristics from among the set S1 of 10,000 characteristics. The system 400 selects a subset S5 of 100 characteristics from among the subset S4 of characteristics to track ad effectiveness. The process above is repeated so that the system 400 continually updates the characteristics to evaluate to determine ad effectiveness.

In some examples, the system 400 associates demographic profiles of the users 104 with the characteristics of on-line activities of the users 104, and determine the effectiveness of the advertisement on various demographic profiles of users. For example, the advertiser 172 may wish to know whether male users who are between ages 18 to 30 are more likely to act on an advertisement or male users who are between ages 30 to 45. The system 400 identifies a set S6 of characteristics of on-line behaviors of male users between ages 18 to 30, and a set S7 of characteristics of on-line behaviors of male users between ages 30 to 45, Based on the merged data log 140 (FIG. 1), the system 400 can determine how the behavior of users having the set S7 or S8 of characteristics change after receiving the ad, and thereby determine the effectiveness of the ad on male users between ages 18 to 30, and male users between ages 30 to 45.

In some examples, after optimizing the ad campaign, the system 400 may provide information on what users the ad campaign is targeting. Rather than providing the "raw" characteristics of the users to the advertiser 172 (e.g., "the ad is most effective on users who visit web sites A1, C3, and F6 in the morning, visit web sites B2, C4, and D7 in the evening, responds to surveys indicating a preference of one brand of coffee over another, frequently conducts on-line shopping on web sites A3 and E4, etc."), the system 400 can identify a demographic profile that more closely associates with the set of characteristics. For example, the system 400 may indicate that the ad 110 is more effective on users 104 who are male, single, between ages 24 to 36, and have college degrees or higher, with a confidence score of x %. The confidence score provides information on how closely the demographic group matches the set of characteristics identified by the system 400. This allows the advertiser 172 to more easily understand which category of users 104 to target. The advertiser 172 may adjust the ad creatives to meet the interests of the category of users 104.

The ad effectiveness determination engine 406 can determine the effectiveness of the ad using information obtained from the virtual panel 102 and information from the ad severs 108. The engine 406 can also use other methods of determining ad effectiveness.

The system 400 can optimize ad campaigns in real time based on current information. Because the on-line behavior patterns of users 104 may change over time, the system 400 can target audiences more accurately to achieve a better return for the ads 110. For example, during one iteration, the system 400 may determine that an ad 110 is most effective on a group of users U4, and in a subsequent iteration may determine that the ad 110 is most effective on another group of users U5. The system 400 may determine to target the ad 110 on a first set of web sites in one iteration, and determine to target a second set of web sites in another iteration.

Figure 9:
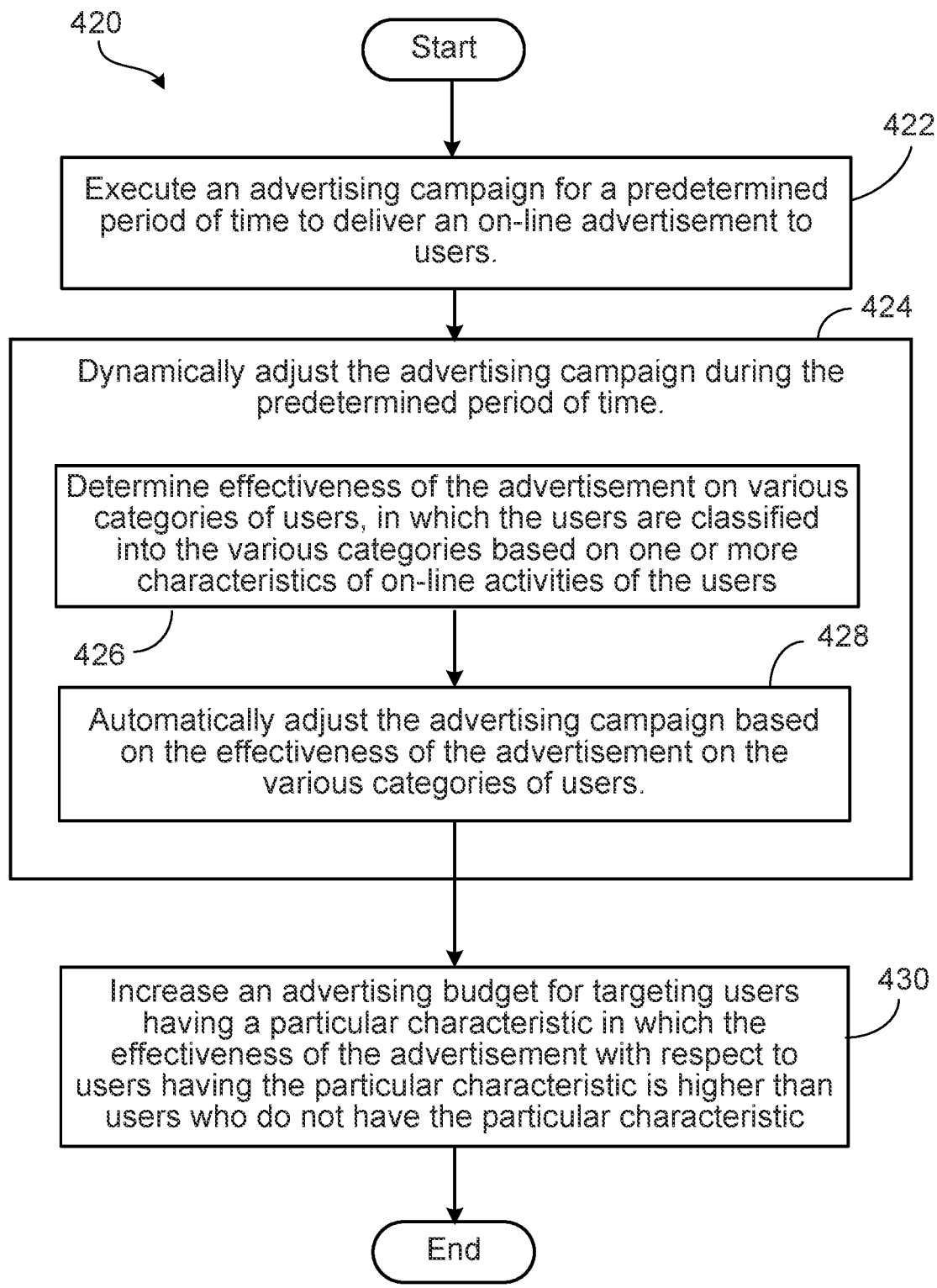
FIG. 9 is a flow diagram of an example process.

FIG. 9 is a flow diagram of a process 420 for dynamically adjusting an ad campaign. The advertising campaign is executed for a predetermined period of time to deliver an on-line advertisement to users (422). The advertising campaign is dynamically adjusted during the predetermined period of time (424). The dynamic adjusting includes determining effectiveness of the advertisement on various categories of users, in which the users are classified into the various categories based on one or more characteristics of on-line activities of the users (426), and automatically adjusting the advertising campaign based on the effectiveness of the advertisement on the various categories of users (428). In some implementations, an advertising budget for targeting users having a particular characteristic is increased, in which the effectiveness of the advertisement with respect to users having the particular characteristic is higher than users who do not have the particular characteristic (430).

Figure 10:
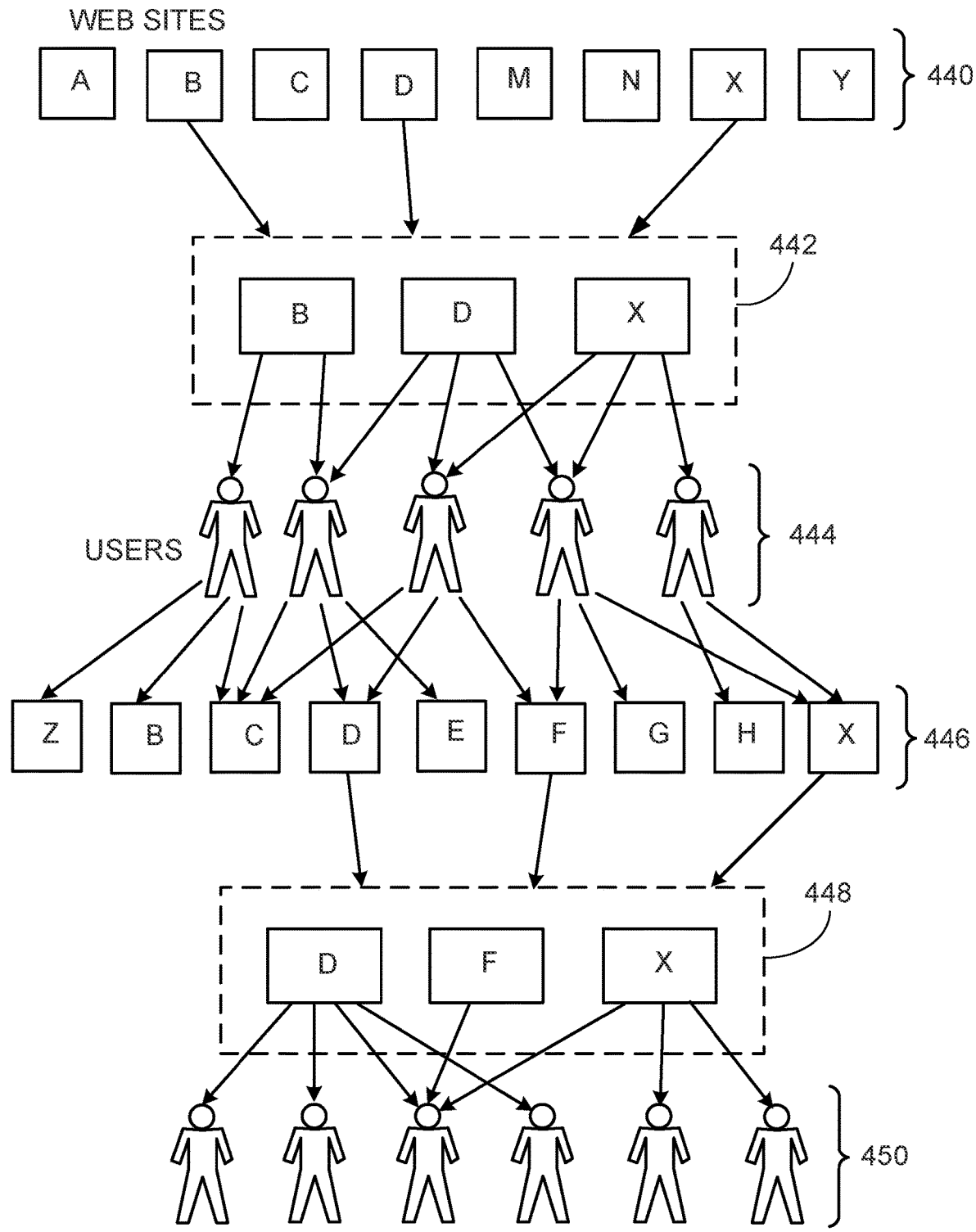
FIG. 10 is a diagram of an example ad campaign optimization process.

FIG. 10 is a diagram showing how the system 400 optimizes an ad campaign by identifying top performing web sites, identifying users who frequently visit the top performing sites, identifying the other sites frequently visited by the users, and adjusts the ad campaign to target the other sites in addition to the top performing sites, and repeating the above process.

In some examples, the system 400 initially targets ads on a group of web sites 440 (e.g., including web sites A, B, C, D, M, N, X, and Y. The ad effectiveness determination engine 406 evaluates the effectiveness of the ad on the group of web sites 440, and identifies a subset of web sites 442 (e.g., including web sites B, D, X) for which the ad has the highest effectiveness. The cluster and categorization engine 402 uses, e.g., merged data log 140, to determine users 444 who frequently visit the web sites 442. The cluster and categorization engine 402 identifies the web sites 446 (e.g., including web sites Z, B, C, D, E, F, G, H, and X) that are frequently visited by the users 444. The web sites 446 may include the web sites 442 (e.g., web sites B, D, and X).

The optimizing engine 404 adjusts the ad campaign to target the ad on the web sites 446. The ad effectiveness determination engine 406 evaluates the effectiveness of the ad on the web sites 446, and identifies the top performing web sites 448 (e.g., including web sites D, F, and X). The top performing web sites 448 (e.g., D, F, and X) may be different from the top performing web sites 442 (e.g., B, D, and X) identified in a previous iteration. The system 400 repeats the process described above, e.g., by using the cluster and categorization engine 402 to determine users 450 who frequently visit the web sites 448, and so forth.

The following describes a method of determining behavior-based profiles 152 (FIG. 2) by inferring a visitor demographic based on visits to web destinations. A web destination refers to a single web experience, indexed and accessed by a distinct URL, which can be presented to a user through a web browser on a network connected computer. A web experience can refer to a single web page, a set of associated web pages, a video presentation, or an interactive game or process. A web destination can also be accessed and/or interacted with through another software application or on another device. By way of illustrative example, a web site can be a web destination. As another example, a piece of content such as an advertisement or a video accessible on a video website, or embedded in a third party site or application, can be a web destination.

A "traversal", as the term is used herein, refers to a record of one or more web destinations visited during a particular web browsing session, presumably by one visitor. For example, if a particular person browsing the Internet visited five web destinations during a particular web browsing session, a record of the five web destinations visited associated with that visitor is referred to in the aggregate as a "traversal". If a particular visitor property is known about the visitor, for example, if the visitor property is "gender" and it is known the visitor is a male, then the traversal is referred to herein as a "scored" traversal with respect to that property. That is, a score of 1.0 male is accorded to the particular traversal. A scored traversal can be "unscored" for a second visitor property. For example, if a second visitor property is "age", and the age of the male visitor is not known, then with respect to the age property, the traversal is unscored.

A web destination owner may wish to determine an estimate of a score for a visitor property for the web destination. For example, if the visitor property is gender, the web destination owner or any other interested party may wish to determine what percentage of visitors to the web destination are male. The percentage of visitors to the web destination that are male is the destination "score" for that particular web destination for the given property. Techniques, methods, computer program products and systems are described herein for inferring (or estimating) a destination score for a web destination for a given property based on a set of traversals including scored and unscored traversals.

For illustrative purposes, the techniques described herein shall refer to one or more inferences of demographic information, however, the same techniques can be used to infer other visitor properties. For example, visitor behavioral characteristics can be inferred.

Figure 11:
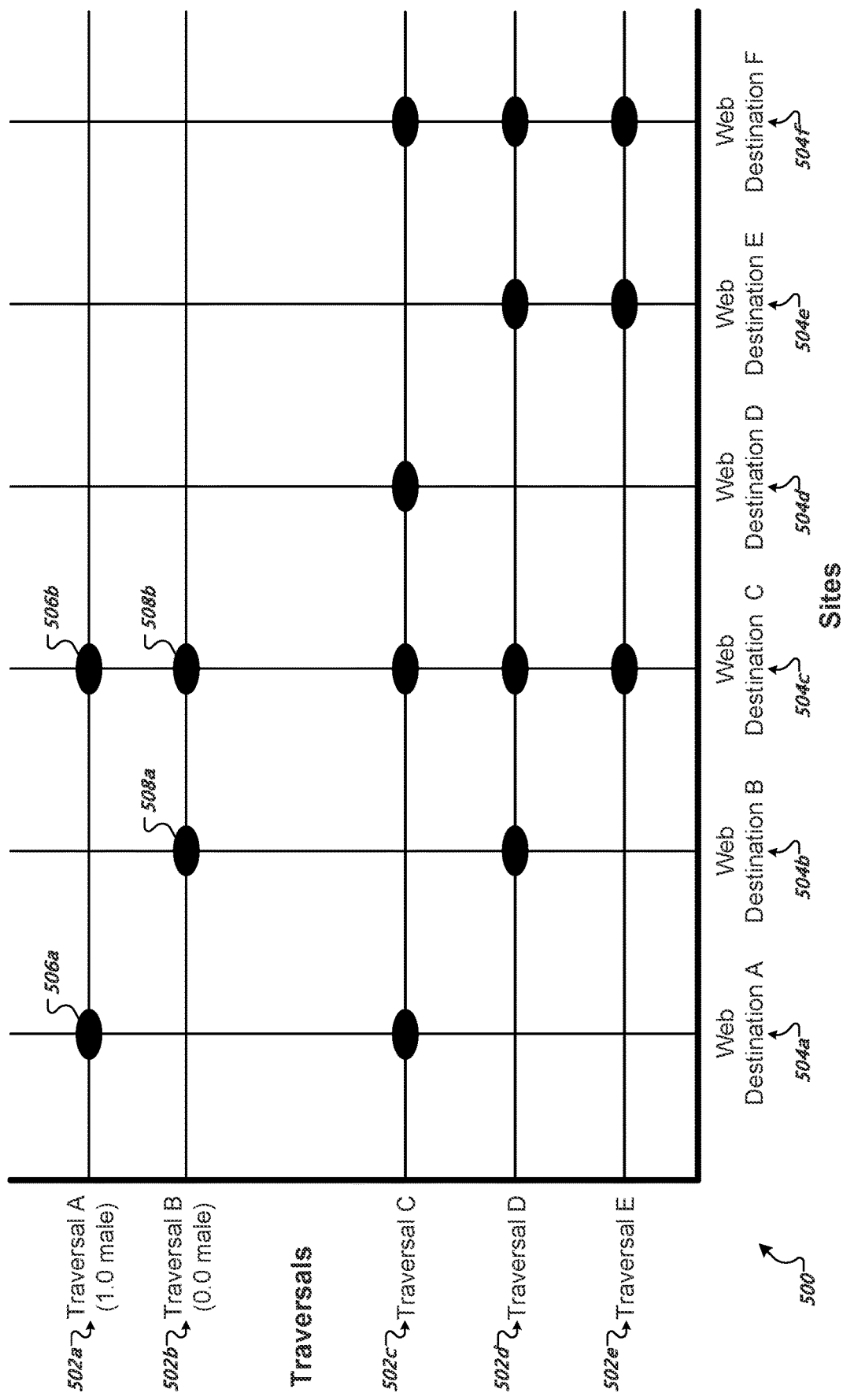
FIG. 11 is an example table.

Referring to FIG. 11, a table 500 illustrates example relationships between traversals and web destinations. In some implementations, scored traversals may be determined from, for example, market research. A market research entity may determine properties of visitors, such as by collecting survey information for a set of visitors and recording the browsing activity of the visitors as traversals. The visitor properties determined from the survey information are associated with the corresponding recorded visitor traversals. Other techniques for obtaining scored traversals can be used, including, but not limited to, visitor-submitted data, visitor self identification, or known visitor associations with a property.

The table 500 includes multiple Traversals A-E 502*a-e* along the vertical axis and multiple Web destinations A-F 504*a-f* along the horizontal axis. For illustrative purposes, the visitor property to be determined with respect to the Web destinations A-F is gender. The Traversal A 502*a* has an associated scored property of "male" (or 1.0 male) and the Traversal B 502*b* has an associated scored property of "female" (or 0.0 male). The Traversals C-E 502*c-e* in this example are unscored with respect to the gender property.

The scored traversals, i.e., Traversals A 502*a* and B 502*b* can be used to determine an estimated destination score for at least those web destinations visited by Traversals A and B. That is, the Traversal A 502*a* includes visits 506*a-b* to the Web destinations A 504*a* and C 504*c*, respectively. The Traversal B 502*b* includes visits 508*a-b* to the Web destinations B 504*b* and C 504*c*, respectively. The estimated destination scores, in this example, for the Web destinations A-C 504*a-c* can be used to determine estimated scores for the Traversals C-E 502*c-e*. All of the traversal scores, i.e., the scores for Traversals A-E 502*a-e* can then be used to estimate destination scores for Web destinations A-F 504*a-f*. In this manner, estimated scores for all of the web destinations depicted in the table 500 can be estimated. Depending on the volume of data and the desired level of accuracy, different algorithms can be employed to determine the estimated destination scores. However, the principal remains the same; that is, a set of traversals including scored and unscored traversals can be used to determine estimated destination scores for a set of one or more web destinations associated with the set of traversals.

By way of illustration, a simple example is shown in FIG. 11. Based on the Traversals A-B 502*a-b* alone, which have a scored gender property, initial estimates of destination scores for the web destinations visited by the Traversals A 502*a* and B 502*b*, i.e., the Web destinations A-C 504*a-c* can be estimated as follows: Web destination A 100% male; Web destination B 0% male; and Web destination C 50% male. Now, based on the estimated destination scores for the Web destinations A-C 504*a-c*, scores can be estimated for the Traversals C-E 502*c-e*. For example, the Traversal C 502*c* visited the Web destination A 504*a*, which has an estimated score of 100% male, and not the Web destination B 504*b*, which has an estimated score of 0% male. Therefore, the Traversal C 502*c* can be estimated to have a gender property of "male." The Traversal D 502*d* visited the Web destination B 504*b* (0% male) and not the Web destination A 504*a* (100% male). Therefore, the Traversal D 502*d* can be estimated to have a gender property of "not male", i.e., "female."

The Traversals C-E 502*c-e* all visited the Web destination C 504*c* (50% male). However, in this example, the Web destination C 504*c* can not be used to conclusively determine the estimated gender property of the Traversals C-E 502*c-e*. In one implementation, the estimated gender property of the Traversal E 502*e* is undecided and initially scored as 0.50.

The gender property of the Web destinations D-F 504*d-f* has not yet been estimated, based on the Traversals A 502*a* and B 502*b*, as neither traversal visited these web destinations. However, now that estimated scores are known for the Traversals C-E 502*c-e*, the Traversals C-E 502*c-e* can be used to estimate the gender property of the Web destinations D-F 504*d-f*. For example, the Traversal C 502*c* has an estimated property of "male" and the Traversal C 502*c* includes visits to the Web destinations D 504*d* and F 504*f*. The Traversal D 502*d* has an estimated property of "female" and includes visits to the Web destinations E 504*e* and F 504*f*. Therefore, based on the estimated gender properties of the Traversals C 502*c* and D 502*d*, the scores of the Web destinations D-F 504*d-f* can be estimated as 100% male, 0% male, and 50% male, respectively.

The Traversal E 502*e* includes visits to the Web destinations C 504*c*, E 504*e*, and F 504*f*. As previously described, the gender property of the Web destination C 504*c* (50% male) is inconclusive/insufficient in determining the estimated gender property of the Traversal E 502*e* as is the gender property of the Web destination F 504*f* (50% male). However, the visit to the Web destination E 504*e* (0% male) by the Traversal E 502*e* suggests that the Traversal E has an estimated gender property of "female."

The process described above is one iteration to determine a first estimate of destination scores for the Web destinations A-F 504*a-f*. However, additional iterations of the process can be performed to further refine the results and improve accuracy of the results. For example, the gender properties of the Web destinations D-F 504*d-f* can be recalculated based on the additional and/or recalculated properties of the Traversals A-E 502*a-e*.

In this example, the scores of the Traversals A-E 502*a-e* are given a binary value (e.g., male or female) and the scores of the Web destinations A-F 504*a-f* are given a continuous value (e.g., the percentage of males visiting the web destination). Alternatively, traversals can be given continuous values for properties (e.g., a percentage or a fractional value) and/or web destinations may be given discrete values for properties (e.g., blue/brown/green/hazel eye color or male/female gender).

In one implementation, an expectation-maximization (EM) algorithm can be used to estimate destination scores based on a set of traversals. The EM algorithm finds maximum likelihood estimates of parameters, in this case, traversal and destination scores. The EM algorithm can be a more efficient technique when dealing with large volumes of data, than the rather simplistic algorithm described above.

Figure 12:
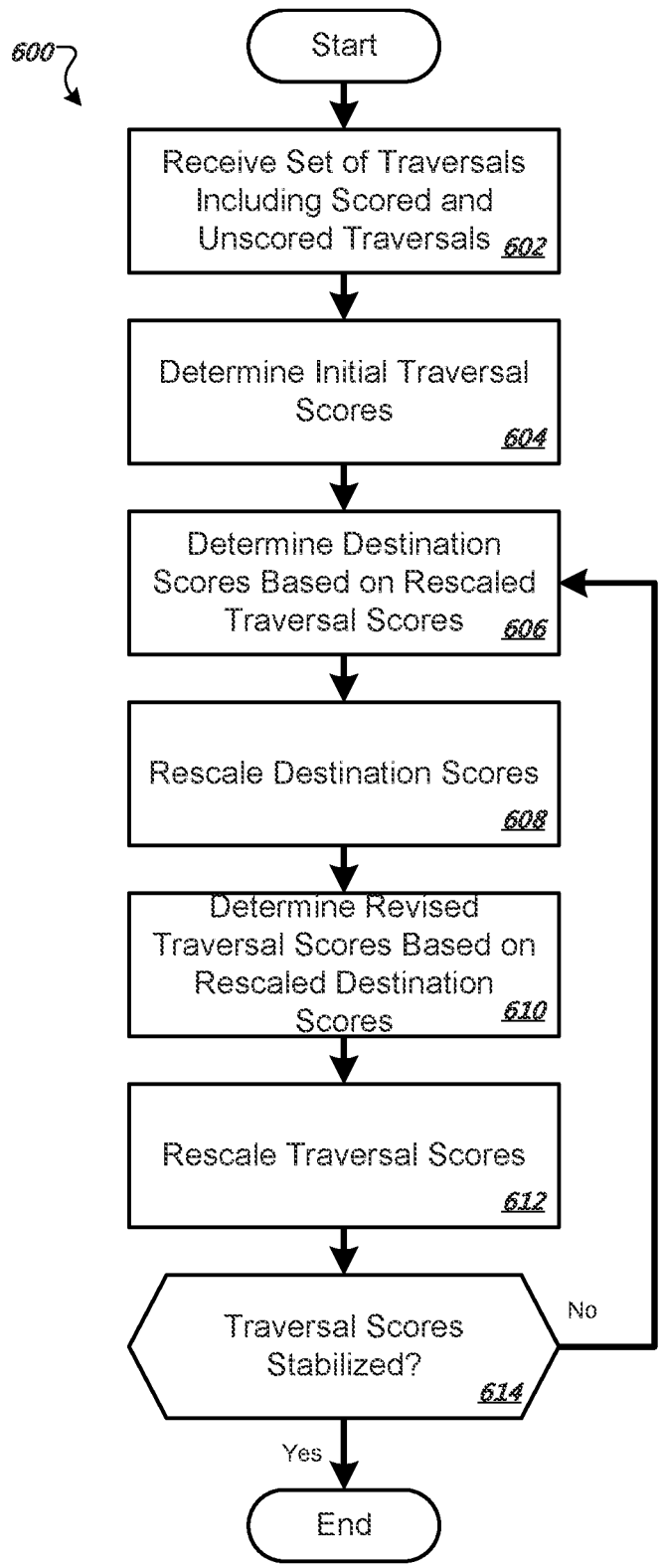
FIGS. 12, 13, 14A, 14B, 15, 16A, and 16B are flow diagrams of example processes.

FIG. 12 is a flowchart of an example process 600 for determining estimated destination scores implementing an EM algorithm. The process 600 begins with receiving a set of traversals including one or more scored traversals and one or more unscored traversals (602). For example, the process 600 may receive the Traversals A-B 502*a-b* having scored properties from market research and the Traversals C-E 502*c-e* from other anonymous recorded browsing activity. In another example, the process 600 may determine the scored properties of the Traversals A-B 502*a-b* from an association of census data with geo-located Internet Protocol (IP) addresses in otherwise anonymous recorded browsing activity.

The process 600 determines an initial traversal score for each of the traversals for a given property (604). In one implementation, the process 600 determines an average of the particular visitor property and assigns the average as the initial traversal score to the unscored Traversals C-E 502*c-e*. By way of illustrative example, the process 600 may determine from survey information that 68% of visitors to the Internet are male, and therefore assign an initial traversal score of 0.68 to the unscored Traversals C-E 502*c-e*. In another example, the process 600 determines an average of the scored Traversals A-B 502*a-b*, i.e., an average of 1.0 and 0.0 is 0.50, and assigns the average to the unscored Traversals C-E 502*c-e* as an initial traversal score. In another example, the process 600 assigns a previously determined default score to the Traversals C-E 502*c-e*. The process 600 uses the known scores of the Traversals A-B 502*a-b* as the initial traversal scores of these traversals. The initial scores of the Traversals A-E 502*a-e* are shown in Table 1 below. In this example, the initial scores of the Traversals C-E are based on known survey information. In this particular example, for illustrative purposes, the initial score of 0.68 is used, being the percentage of users of the Internet that are male.

TABLE 1

Initial Traversal Scores

| Traversal | Initial Traversal Score |
| --- | --- |
| Traversal A | 1.0 |
| Traversal B | 0.0 |
| Traversal C | 0.68 |
| Traversal D | 0.68 |
| Traversal E | 0.68 |

The process 600 next determines destination scores based on the current traversal scores, which in the first iteration are the initial traversal scores (606). One example process for determining destination scores (estimates) based on the traversal scores is described in further detail below in reference to FIGS. 14A-B, although a different algorithm to determine the estimated destination scores can be used.

Once the destination scores are determined, the process 600 rescales the destination scores (608). That is, some destination scores can be increased and others decreased. One example process for rescaling the destination scores is described in further detail below in reference to FIG. 15, although a different algorithm to rescale the destination scores can be used.

Revised traversal scores are now determined based on the rescaled destination scores (610). One example process for determining revised traversal scores based on the rescaled destination scores is described in further detail below in reference to FIGS. 16A-B, although a different algorithm can be used.

In a next step the process 600 rescales the traversal scores (612). Some traversal scores can be increased and others decreased. One example process for rescaling the traversal scores is described in further detail below in reference to FIG. 13, although a different algorithm to rescale the traversal scores can be used.

A determination is then made as to whether the traversal scores have stabilized. That is, a rescaled traversal score can be compared to the initial traversal score (or the rescaled traversal score of a previous iteration) to determine whether the traversal score has stabilized. In one implementation, a traversal score is considered to have stabilized if the RMS (root mean square) difference between the traversal scores for two consecutive iterations of the process 600 is less than 0.001.

If the traversal scores are not stabilized ("no" branch of step 614), then the process 600 loops back to step 606 and repeats steps 606 to 612 until the traversal scores stabilize. Once the traversal scores stabilize ("yes" branch of step 614), then the process 600 can end.

In one implementation, the estimated destination scores are the rescaled destination scores calculated in the last iteration of the process 600 at step 612. In another implementation, once the traversal scores are stabilized, the stabilized traversal scores are input back into the process at step 606 and the estimated destination scores are the rescaled destination scores determined at step 610.

Figure 13:
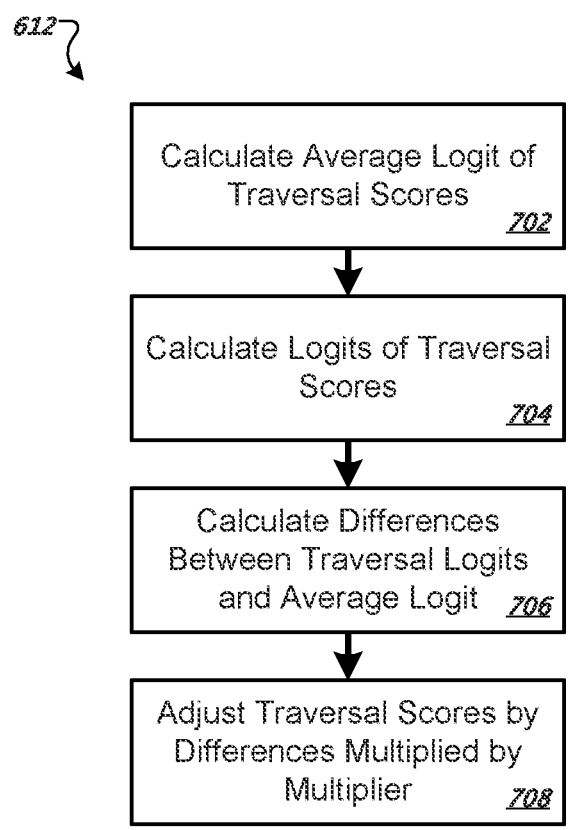

Referring now to FIG. 13, a flowchart is shown including an example process 612 for rescaling traversal scores. The process 612 begins with calculating the average logit of the traversal scores (702). The process 612 calculates logits of the traversal scores (704). For example, the process 612 can calculate the logit of a score using the following equation:

$$\text{logit(score)} = \log\left(\frac{\text{score}}{1-\text{score}}\right)$$

The process 612 calculates differences between the calculated traversal score logits and the calculated average traversal score logit (706). The process 612 adjusts each of the traversal scores by the corresponding differences multiplied by a multiplier (708). For example, the process 706 can multiply the differences by a multiplier of 2.0 and adjust or add the multiplied differences to the corresponding traversals. In one implementation, the scored traversals do not change; that is, they are not rescaled nor otherwise revised throughout iterations of the algorithm.

Figure 14A:
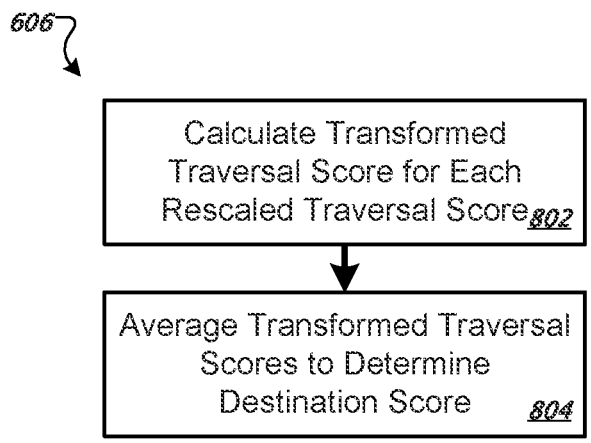

Referring now to FIG. 14A, a flowchart is shown including an example process 606 for determining destination scores based on rescaled traversal scores. The process 606 begins with calculating a transformed traversal score for each of the rescaled traversal scores (802). Next, the process 606 averages the transformed traversal scores associated with a particular web destination to determine the destination score for that web destination (804).

Figure 14B:
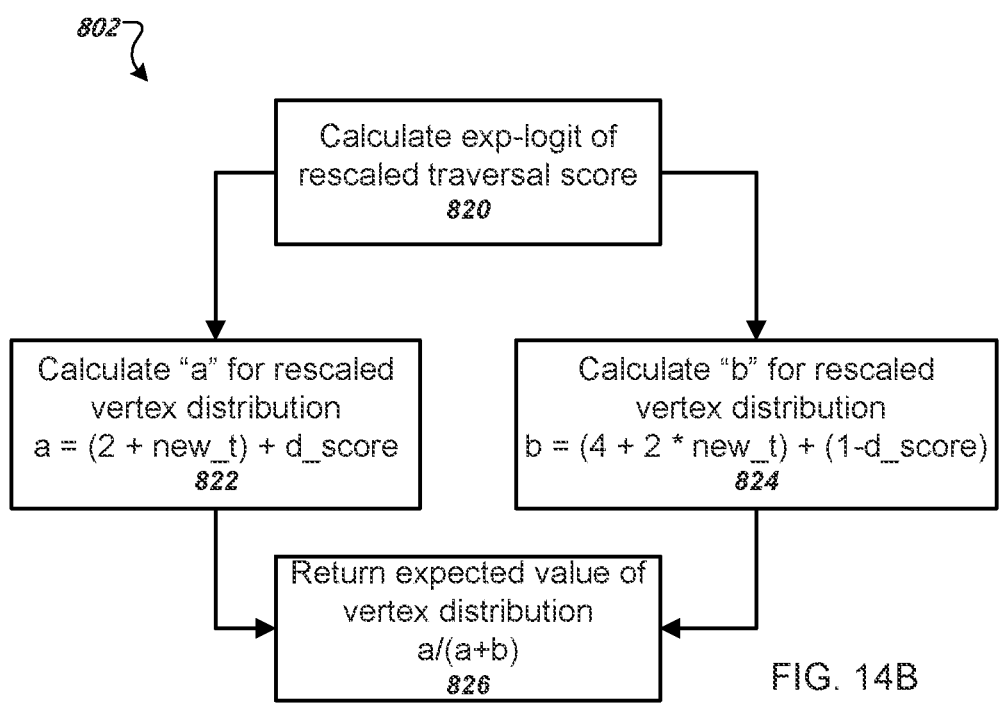

Referring now to FIG. 14B, a flowchart is shown including an example process 802 for calculating transformed transversal scores based on rescaled traversal scores i.e., one implementation for performing step 802 of FIG. 14A. An exp-logit is calculated for each rescaled traversal score (820). Exp-logit refers to the result of applying the exponential function to the logit, for example, exp-logit(x)=exp (logit(x))=exp (log(x/(1−x)))=x/(1−x).

An "a" parameter and a "b" parameter are calculated, where:

$a=(2+\text{new\_}t)+d\_\text{score}$ where, new_t=exp(logit (t_score), where t_score is the rescaled traversal score; and d_score=the last computed destination score corresponding to a vertex (t, d) [see FIG. 11].

$b=(4+2*\text{new\_}t)+(1-d\_\text{score})$

The a and b parameters are then used to calculated the transformed traversal score for each rescaled traversal score, where the transformed traversal score=a/(a+b).

Figure 15:
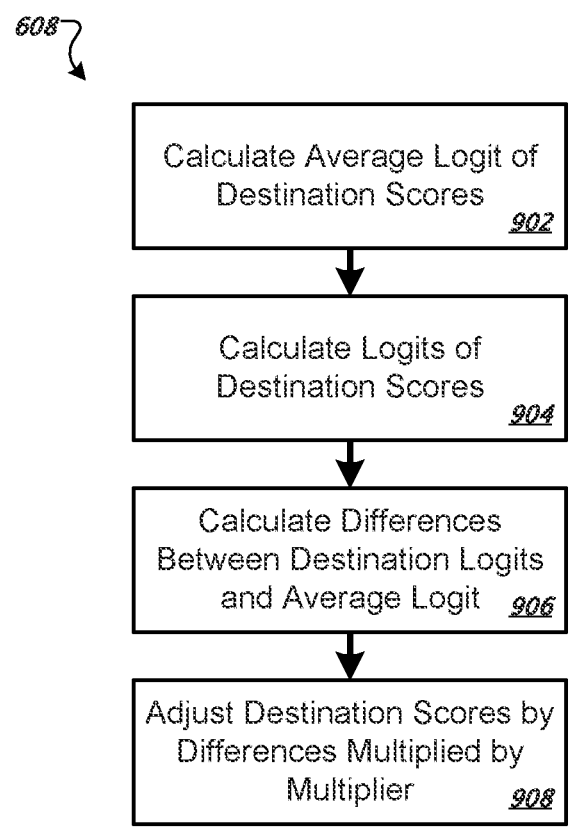

Referring now to FIG. 15, a flowchart is shown including an example process 208 for rescaling the destination scores. In one implementation, the process 608 can be used to implement step 608 shown in FIG. 12. The process 608 calculates an average logit of the destination scores (902). The logits of the destination scores are calculated (904). The process 608 calculates differences between the calculated destination score logits and the calculated average destination score logit (906).

The process 608 adjusts each of the destination scores by the corresponding differences multiplied by a multiplier (908). For example, the process 608 can multiply the differences by a multiplier that maintains the same logit standard deviation before and after adjusting the destination scores by the corresponding differences.

Figure 16A:
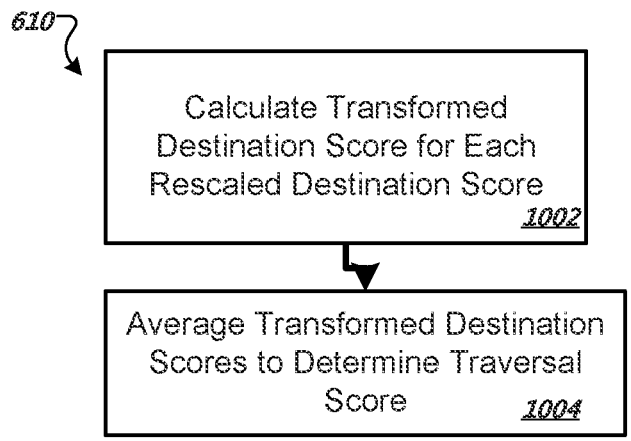

Referring now to FIG. 16A, a flowchart is shown including an example of a process 610 for determining revised traversal scores based on rescaled web destination scores. The process 610 begins with calculating a transformed destination score for each of the rescaled web destination scores (1002). The calculation of the transformed destination scores is described with respect to FIG. 6B. Next the process 610 averages the transformed destination scores to determine the revised traversal score (1004).

Figure 16B:
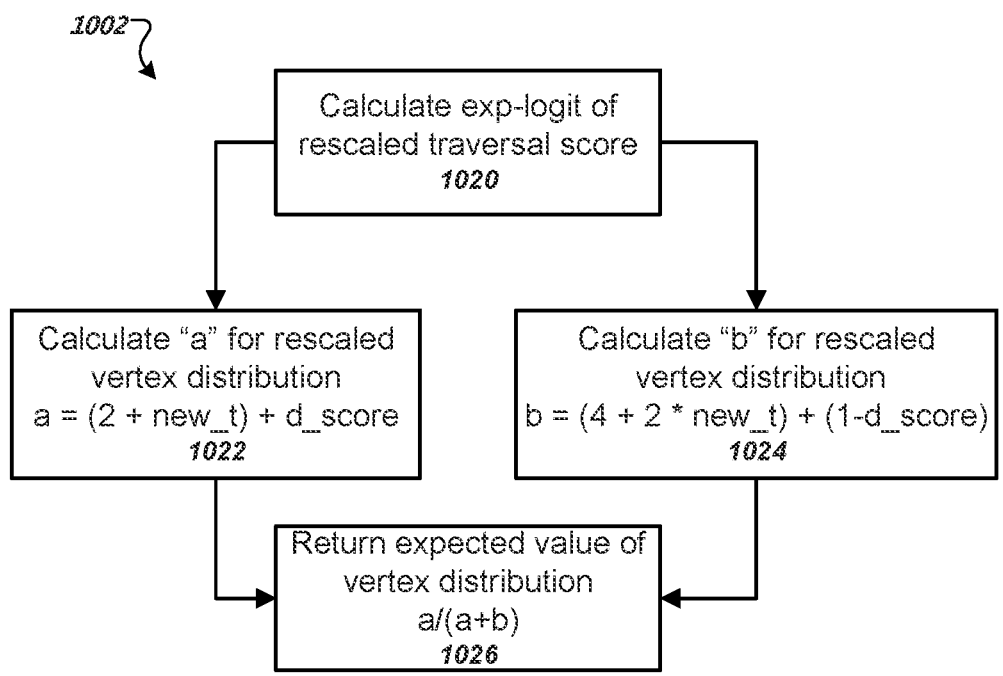

Referring now to FIG. 16B, a flowchart is shown including an example process 1002 for calculating transformed destination scores based on rescaled destination scores i.e., one implementation for performing step 1002 of FIG. 16A. An exp-logit is calculated for each rescaled traversal score (820). Exp-logit refers to the result of applying the exponential function to the logit, for example, exp-logit(x)=exp (logit(x))=exp (log(x/(1−x)))=x/(1−x).

An "a" parameter and a "b" parameter are calculated, where:

$$a=(2+\text{new\_}t)+d\_\text{score}$$

where, new_t=exp(logit (t_score), where t_score is the rescaled traversal score; and d_score=the last computed destination score corresponding to a vertex (t, d) [see FIG. 1].

$$b=(4+2*\text{new\_}t)+(1-d\_\text{score})$$

The a and b parameters are then used to calculated the transformed destination score for each rescaled destination score, where the transformed destination score=a/(a+b).

As described above, an algorithm can be employed to fill in the missing values on the table 500 shown in FIG. 11. That is, scores for the unscored Traversals C-E 502c-e can be estimated and destination scores for the Web destinations A-F 504a-f can be estimated, starting with only the scored traversals, i.e., Traversals A and B 502a-b. With the missing values filled in, a visitor property for each of the Web destinations A-F can be inferred. In some examples the visitor property is demographic information. Such as in our illustrative example, the visitor property is the gender demographic. The end result of the process is to determine an estimated destination score for that visitor property. This information can be useful, for example, when determining content for the web destination, advertising to display on the web destination and where and how to advertise to attract visitors to the web destination, amongst other things.

In some embodiments, additional steps that preserve visitor privacy can advantageously be included. Visitor privacy can be preserved by use of anonymized data, noise introduction at the individual visitor level, or other techniques that protect the privacy of individual users that are part of a larger demographic group.

FIG. 17 is a schematic representation of a general computing system 300 that can be used to implement the system 100. Computing device 300 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, memory on processor 302, or a propagated signal.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Each of such devices (e.g., standard server, rack server system, personal computer, laptop computer) may contain one or more of computing device 300, and an entire system may be made up of multiple computing devices 300 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated.

Though reference is made to determination of effectiveness of advertisements, the system 100 can determine the effectiveness of other forms of content including other forms of sponsored content. The ads 110 can include, e.g., text advertisements, audio advertisements, video advertisements, Flash advertisements, or any other types of advertisements. The examples in FIGS. 1 and 2 use page link analysis requests sent from page link analysis tools to determine which web sites the users 104 visited. Other tools or applications may also be used to provide data that can be used to determine the web sites visited by the users 104. For example, users 104 can volunteer to install an application that tracks the web browsing activities of users in exchange for awards or credits to the users 104. The application can send information about the web browsing activities to a server each time the user visits a new web site, or keep a log of the web sites visited by the user and send the log to the server periodically. The server establishes web browsing history logs based on the received data. The server aggregates data collected from several users so that only the aggregate information is used to determine effectiveness of advertisements to ensure privacy of the users 104.

In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:
1. A computer-implemented method, comprising:
presenting, at a first client device of a first user, a third-party content item and additional content items in an application interface;
executing an analysis program at the first client device while presenting the third-party content item and additional content items in the application interface, wherein the analysis program is configured to monitor for occurrence of events related to the third-party content item in the application interface;
detecting, with the analysis program at the first client device, an event comprising a user interaction with the third-party content item; and
transmitting, from the first client device and to a server system, an indication of the event that was detected with the analysis program and that comprises data indicating (i) the user interaction with the third-party content item, (ii) a time at which the third-party content item was presented at the first client device, and (iii) an Internet Protocol (IP) address of the first client device;
wherein the server system is configured:
(i) to process the indication of the event that was detected with the analysis program at the first client device and indications of events detected at other client devices to determine an effectiveness of the third-party content item with respect to a first category of users including the first user, including,
accessing an anonymized history log that includes a plurality of records that each include data indicating (i) a resource presented at a corresponding client device and (ii) an IP address of the corresponding client device at which the resource was presented, the anonymized history log being filtered to remove user information and including noise data comprising additional records for fake resource presentations and corresponding IP addresses;
correlating each indication of event detected by a client device with one or more records of the anonymized history log to identify a particular resource with which the third-party content item was presented when the event was detected and additional resources accessed by a user of the client device after the third-party content item was presented at the client device using (i) a time at which the third-party content item was presented at the client device, (ii) an IP address of the client device, and determining the effectiveness of the third-party content item with respect to the first category of users based on each particular resource and the additional resources visited by client devices of the first category of users after the third-party content item was presented at the client devices of the first category of users; and (ii) based on the determined effectiveness of the third-party content item with respect to the first category of users including the first user, to adjust a parameter of a content distribution campaign to increase or decrease resources directed to the first category of users.

2. The computer-implemented method of claim 1, wherein the analysis program is configured to record an address of the third-party content item, and transmitting the indication of the event comprises transmitting an indication of the address of the third-party content item.

3. The computer-implemented method of claim 2, wherein the analysis program is configured to determine the address of the third-party content item by monitoring communication on a particular network port of the client device.

4. The computer-implemented method of claim 1, wherein the server system is configured to cluster categories of users according to an effectiveness of the third-party content item on the categories of users, wherein a first cluster consists of categories of users for which a high effectiveness of the third-party content item was measured, wherein a second cluster consists of categories of users for which a low effectiveness of the third-part content item was measured.

5. The computer-implemented method of claim 1, wherein the server system is configured to determine the effectiveness of the third-party content item with respect to the first category of users based on information describing at least one of web sites frequently visited by users in the first category or interests of users in the first category.

6. The computer-implemented method of claim 1, wherein adjusting a parameter of the content distribution campaign comprises increasing a campaign budget directed to the first category of users.

7. The computer-implemented method of claim 1, wherein adjusting a parameter of the content distribution campaign comprises increasing resources directed to selecting the third-party content item for display on a web site accessed by users in the first category when the web site is displayed to the users in the first category and to users in one or more different categories.

8. The computer-implemented method of claim 1, wherein adjusting a parameter of the content distribution campaign comprises:

identifying a web site with which the third-party content item has not been displayed and that has been accessed by a plurality of users in the first category; and allocating resources directed to displaying the third-party content item with the web site in response to identifying the web site.

9. The computer-implemented method of claim 1, further comprising:

generating one or more reports that indicate the effectiveness of the third party content such that data received from the client devices of users cannot be traced to the users, including ensuring that data related to an event for which a report is being generated has been received from at least a threshold number of different client devices prior to generating the report for the event; and displaying each generated report.

10. A device comprising:

a processor; and a non-transitory computer-readable medium encoded with instructions that, when executed by the processor, cause performance of operations comprising:

presenting, at the device of a first user, a third-party content item and additional content items in an application interface;

executing an analysis program at the device while presenting the third-party content item and additional content items in the application interface, wherein the analysis program is configured to monitor for occurrence of events related to the third-party content item in the application interface;

detecting, with the analysis program at the device, an event comprising a user interaction with the third-party content item; and transmitting, from the device and to a server system, an indication of the event that was detected with the analysis program and that comprises data indicating (i) the user interaction with the third-party content item, (ii) a time at which the third-party content item was presented at the device, and (iii) an Internet Protocol (IP) address of the device;

wherein the server system is configured:

(i) to process the indication of the event that was detected with the analysis program at the device and indications of events detected at other client devices to determine an effectiveness of the third-party content item with respect to a first category of users including the first user, including, accessing an anonymized history log that includes a plurality of records that each include data indicating (i) a resource presented at a corresponding client device and (ii) an IP address of the corresponding client device at which the resource was presented, the anonymized history log being filtered to remove user information and including noise data comprising additional records for fake resource presentations and corresponding IP addresses;

correlating each indication of event detected by a client device with one or more records of the anonymized history log to identify a particular resource with which the third-party content item was presented when the event was detected and additional resources accessed by a user of the client device after the third-party content item was presented at the client device using (i) a time at which the third-party content item was presented at the client device, (ii) an IP address of the client device, and determining the effectiveness of the third-party content item with respect to the first category of users based on each particular resource and the additional resources visited by client devices of the first category of users after the third-party content item was presented at the client devices of the first category of users; and (ii) based on the determined effectiveness of the third-party content item with respect to the first category of users including the first user, to adjust a parameter of a content distribution campaign to increase or decrease resources directed to the first category of users.

11. The device of claim 10, wherein the analysis program is configured to record an address of the third-party content item, and transmitting the indication of the event comprises transmitting an indication of the address of the third-party content item.

12. The device of claim 11, wherein the analysis program is configured to determine the address of the third-party content item by monitoring communication on a particular network port of the device.

13. The device of claim 10, wherein the server system is configured to cluster categories of users according to an effectiveness of the third-party content item on the categories of users, wherein a first cluster consists of categories of users for which a high effectiveness of the third-party content item was measured, wherein a second cluster consists of categories of users for which a low effectiveness of the third-part content item was measured.

14. The device of claim 10, wherein the server system is configured to determine the effectiveness of the third-party content item with respect to the first category of users based on information describing at least one of web sites frequently visited by users in the first category or interests of users in the first category.

15. The device of claim 10, wherein adjusting a parameter of the content distribution campaign comprises increasing a campaign budget directed to the first category of users.

16. The device of claim 10, wherein adjusting a parameter of the content distribution campaign comprises increasing resources directed to selecting the third-party content item for display on a web site accessed by users in the first category when the web site is displayed to the users in the first category and to users in one or more different categories.

17. A non-transitory computer-readable medium having instructions stored thereon that, when executed by a processor, cause performance of operations comprising:
presenting, at a first client device of a first user, a third-party content item and additional content items in an application interface;
executing an analysis program at the first client device while presenting the third-party content item and additional content items in the application interface, wherein the analysis program is configured to monitor for occurrence of events related to the third-party content item in the application interface;
detecting, with the analysis program at the first client device, an event comprising a user interaction with the third-party content item; and
transmitting, from the first client device and to a server system, an indication of the event that was detected with the analysis program and that comprises data indicating (i) the user interaction with the third-party content item, (ii) a time at which the third-party content item was presented at the first client device, and (iii) an Internet Protocol (IP) address of the first client device;
wherein the server system is configured:
(i) to process the indication of the event that was detected with the analysis program at the first client device and indications of events detected at other client devices to determine an effectiveness of the third-party content item with respect to a first category of users including the first user, including,
accessing an anonymized history log that includes a plurality of records that each include data indicating (i) a resource presented at a corresponding client device and (ii) an IP address of the corresponding client device at which the resource was presented, the anonymized history log being filtered to remove user information and including noise data comprising additional records for fake resource presentations and corresponding IP addresses;
correlating each indication of event detected by a client device with one or more records of the anonymized history log to identify a particular resource with which the third-party content item was presented when the event was detected and additional resources accessed by a user of the client device after the third-party content item was presented at the client device using (i) a time at which the third-party content item was presented at the client device, (ii) an IP address of the client device, and
determining the effectiveness of the third-party content item with respect to the first category of users based on each particular resource and the additional resources visited by client devices of the first category of users after the third-party content item was presented at the client devices of the first category of users; and
(ii) based on the determined effectiveness of the third-party content item with respect to the first category of users including the first user, to adjust a parameter of a content distribution campaign to increase or decrease resources directed to the first category of users.

18. The non-transitory computer-readable medium of claim 17, wherein the analysis program is configured to record an address of the third-party content item, and transmitting the indication of the event comprises transmitting an indication of the address of the third-party content item.

19. The non-transitory computer-readable medium of claim 18, wherein the analysis program is configured to determine the address of the third-party content item by monitoring communication on a particular network port of the client device.

20. The non-transitory computer-readable medium of claim 17, wherein the server system is configured to cluster categories of users according to an effectiveness of the third-party content item on the categories of users, wherein a first cluster consists of categories of users for which a high effectiveness of the third-party content item was measured, wherein a second cluster consists of categories of users for which a low effectiveness of the third-part content item was measured.

* * * * *